United States Patent
Hsieh et al.

(10) Patent No.: US 10,276,394 B2
(45) Date of Patent: Apr. 30, 2019

(54) HYBRID DOUBLE PATTERNING METHOD FOR SEMICONDUCTOR MANUFACTURE

(71) Applicant: Taiwan Semiconductor Manufacturing Co., Ltd., Hsinchu (TW)

(72) Inventors: Ken-Hsien Hsieh, Taipei (TW); Wen-Li Cheng, Taipei (TW); Dong-Yo Jheng, Hsinchu (TW); Chih-Ming Lai, Hsinchu (TW); Ru-Gun Liu, Hsinchu County (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 72 days.

(21) Appl. No.: 15/704,367

(22) Filed: Sep. 14, 2017

(65) Prior Publication Data

US 2019/0080921 A1    Mar. 14, 2019

(51) Int. Cl.
*G06F 7/50*    (2006.01)
*H01L 21/308*    (2006.01)
*G06F 17/50*    (2006.01)

(52) U.S. Cl.
CPC ...... *H01L 21/3088* (2013.01); *G06F 17/5068* (2013.01); *G06F 17/5081* (2013.01); *G06F 2217/12* (2013.01)

(58) Field of Classification Search
USPC .................................. 716/51, 52, 53, 54, 55
See application file for complete search history.

(56) References Cited

U.S. PATENT DOCUMENTS

| | | | |
|---|---|---|---|
| 6,894,762 B1 | 5/2005 | Berman et al. | |
| 9,184,054 B1 | 11/2015 | Huang et al. | |
| 9,679,095 B1 * | 6/2017 | Li | G06F 17/5068 |
| 2010/0191357 A1 * | 7/2010 | Maeda | G06F 17/5068 700/97 |
| 2011/0078638 A1 * | 3/2011 | Kahng | G06F 17/50 716/52 |
| 2012/0137261 A1 | 5/2012 | Ban et al. | |

(Continued)

FOREIGN PATENT DOCUMENTS

| | | |
|---|---|---|
| TW | 201102848 | 1/2011 |
| TW | 201705027 | 2/2017 |

(Continued)

*Primary Examiner* — Brian Ngo
(74) *Attorney, Agent, or Firm* — Haynes and Boone, LLP

(57) ABSTRACT

A method of fabricating an integrated circuit (IC) with first and second different lithography techniques includes providing a layout of the IC having IC patterns; and deriving a graph from the layout. The graph has vertices and edges connecting some of the vertices. The vertices represent the IC patterns. The edges are classified into at least two types, a first type connecting two vertices that are to be patterned separately with the first and second lithography techniques, a second type connecting two vertices that are to be patterned in a same process using the first lithography technique or to be patterned separately with the first and second lithography techniques. The method further includes decomposing the vertices into first and second subsets, wherein the IC patterns corresponding to the first and second subsets are to be patterned on a wafer using the first and second lithography techniques respectively.

20 Claims, 20 Drawing Sheets

(56) References Cited

U.S. PATENT DOCUMENTS

| | | | |
|---|---|---|---|
| 2013/0074018 A1* | 3/2013 | Hsu | G03F 1/70 |
| | | | 716/55 |
| 2013/0174106 A1* | 7/2013 | Hsu | G06F 17/50 |
| | | | 716/55 |
| 2013/0179848 A1* | 7/2013 | Liu | G06F 17/5068 |
| | | | 716/55 |
| 2014/0259658 A1 | 9/2014 | Hsu et al. | |
| 2016/0292345 A1* | 10/2016 | Pikus | G06F 17/5072 |
| 2017/0193147 A1 | 7/2017 | Hsieh et al. | |

FOREIGN PATENT DOCUMENTS

| | | |
|---|---|---|
| TW | 201810096 | 3/2018 |
| WO | WO2011162890 | 12/2011 |

* cited by examiner

HYBRID DOUBLE PATTERNING METHOD FOR SEMICONDUCTOR MANUFACTURE

BACKGROUND

The semiconductor integrated circuit (IC) industry has experienced rapid growth. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling down has also increased the complexity of processing and manufacturing ICs and, for these advances to be realized, similar developments in IC manufacturing are needed.

For example, as the geometry sizes shrink, it generally becomes difficult for conventional photolithography processes to form semiconductor features having these small sizes. One approach to this issue uses a double patterning (DP) method. A typical DP method decomposes an IC layout into two subsets and fabricates a photomask for each subset. A wafer is patterned with the two photomasks in two lithography processes. Images of the two lithography processes overlay with one another to collectively produce a denser image on the wafer. In traditional DP methods, the two lithography processes have the same resolution, which in some cases limits the minimum critical dimension (CD) that can be produced by the DP methods. Improvements in these areas are desired.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

Figure 1:
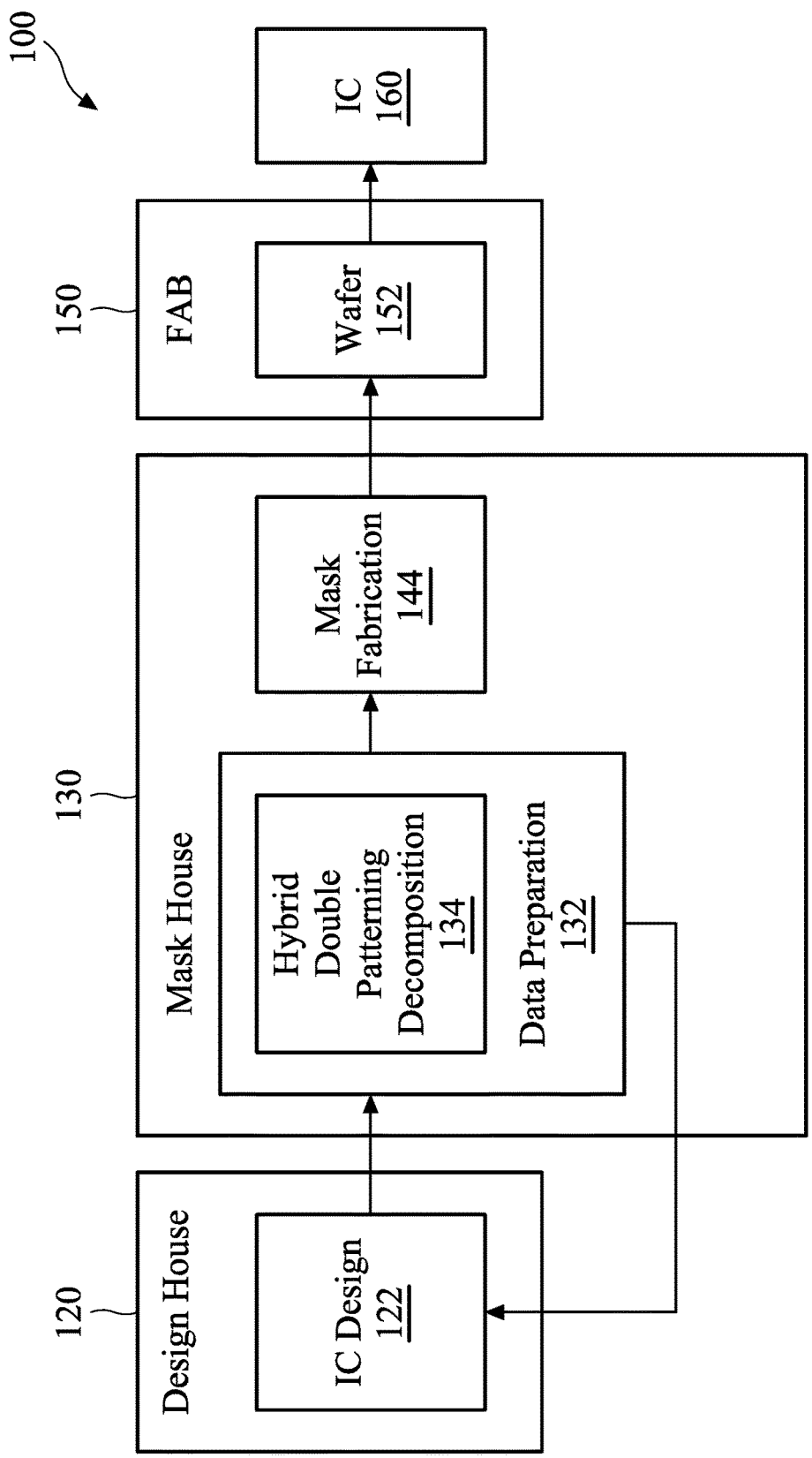
FIG. 1 is a simplified block diagram of an embodiment of an integrated circuit (IC) manufacturing system and an associated IC manufacturing flow, which may benefit from aspects of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure in various embodiments is generally related to IC design and fabrication. Particularly, the present disclosure is related to using hybrid double patterning (DP) methods for IC fabrication. In hybrid double patterning, an IC layout is decomposed into two subsets and each of the two subsets appears in a photomask layer (or a masking layer) in a data file. The data file is then used to fabricate photomasks or converted to direct-write data patterns for maskless lithography. Two photomasks (or one photomask and one direct-write data pattern) corresponding to the two subsets are then used in two different lithography techniques for collectively patterning a wafer. As used herein, a photomask (or mask or reticle) is an apparatus used in photolithography (or lithography), such as a plate having fused quartz substrate with a patterned chromium layer for deep ultraviolet (DUV) lithography, while a photomask layer is a data file (such as a GDS file) used for fabricating a photomask.

Using two photomasks in two different lithography techniques to pattern a same wafer layer distinguishes the hybrid double patterning from traditional double patterning that use the same lithography technique to accomplish the task. For example, hybrid double patterning may use extreme ultravoilet (EUV) lithography to produce a first subset of patterns, and use 193 nm immersion lithography to produce a second subset of patterns. In various embodiments, the two lithography techniques in hybrid double patterning can be any two of: EUV lithography; high numerical aperture (high-NA) EUV lithography; ultraviolet lithography using a wavelength of 436 nm, 405 nm, or 365 nm; DUV lithography using a wavelength of 248 nm, 193 nm, or 157 nm; immersion lithography; e-beam; and other available lithography techniques. In the case of e-beam lithography (which is maskless lithography), the "photomask" is in the form of a direct-write data pattern rather than a physical apparatus.

For the convenience of discussion, out of the two lithography techniques, the one with a higher resolution is referred to as L1 lithography or simply "L1," and the other is referred to as L2 lithography or simply "L2." Also, it is commonly understood that having a higher (lower) resolution means having a smaller (larger) resolution. In other words, L1 can produce (or resolve) smaller feature sizes than L2. For example, L1 may have a resolution of 13.5 nm, while L2 may have a resolution of 45 nm.

The hybrid double patterning lithography offers some benefits over traditional double patterning lithography. In one example where L1 has a higher resolution than the lithography techniques of the traditional double patterning lithography, the overall resolution of the hybrid double patterning can be higher (better) than the traditional double patterning lithography. In another example where L2 has a lower resolution but a lower cost than the lithography techniques of the traditional double patterning lithography, the overall costs of the hybrid double patterning can be lower (better) than the traditional double patterning lithography.

However, there are also challenges associated with hybrid double patterning lithography. One challenge is that decomposing an IC layout into two subsets suitable for two different lithography techniques can be difficult because it is no longer a simple 2-colorability problem. In the following discussion, the present disclosure provides some innovative 2-coloring methods to effectively meet this challenge. The provided methods may be performed at a design stage by design engineers and/or layout engineers. Alternatively or additionally, they may be performed at a later stage after the design stage, for example, by a foundry in a fabrication stage.

FIG. 1 is a simplified block diagram of an embodiment of an integrated circuit (IC) manufacturing system 100 and an IC manufacturing flow associated therewith, which may benefit from various aspects of the provided subject matter. The IC manufacturing system 100 includes a plurality of entities, such as a design house 120, a mask house 130, and an IC manufacturer 150 (i.e., a fab), that interact with one another in the design, development, and manufacturing cycles and/or services related to manufacturing an IC device 160. The plurality of entities are connected by a communications network, which may be a single network or a variety of different networks, such as an intranet and the Internet, and may include wired and/or wireless communication channels. Each entity may interact with other entities and may provide services to and/or receive services from the other entities. One or more of the design house 120, mask house 130, and IC manufacturer 150 may be owned by separate companies or by a single company, and may even coexist in a common facility and use common resources.

The design house (or design team) 120 generates an IC design layout (or IC layout) 122. The IC design layout 122 includes various geometrical patterns (e.g., polygons) designed for the IC device 160. The geometrical patterns correspond to IC features in one or more semiconductor layers that make up the IC device 160. Exemplary IC features include active regions, gate electrodes, source and drain features, isolation features, metal lines, contact plugs, vias, and so on. The design house 120 implements appropriate design procedures to form the IC design layout 122. The design procedures may include logic design, physical design, place and route, and/or various design checking operations. The IC design layout 122 is presented in one or more data files having information of the geometrical patterns. For example, the IC design layout 122 can be expressed in a GDSII file format or DFII file format.

The mask house 130 uses the IC design layout 122 to manufacture a set of masks to be used for fabricating the various layers of the IC device 160 according to the IC design layout 122. The mask house 130 performs data preparation 132 and mask fabrication 144. The data preparation 132 translates the IC design layout 122 into a form that can be physically written by a mask writer. The mask fabrication 144 fabricates the set of masks (photomask or reticle).

In the present embodiment, the data preparation 132 includes a hybrid double patterning decomposition 134 which is configured to decompose the IC design layout 122 into two subsets suitable for two different lithography techniques (L1 and L2) employed by the fab 150. The data preparation 132, particularly the hybrid double patterning decomposition 134, may produce feedback to the design house 120, which may be used to modify (or adjust) the IC design layout 122 to make it compliant for the manufacturing processes in the fab 150. As discussed above, the hybrid double patterning decomposition 134 may be implemented by the design house 120, instead of by the mask house 130, in some embodiments. The data preparation 132 may further include other manufacturing flows such as optical proximity correction (OPC), off-axis illumination, sub-resolution assist features, other suitable techniques, or combinations thereof. The details of the hybrid double patterning decomposition 134 will be discussed in later section of the present disclosure.

After the data preparation 132 prepares data for the mask layers, the mask fabrication 144 fabricates a group of masks including the two masks for hybrid double patterning. For example, an electron-beam (e-beam) or a mechanism of multiple e-beams is used to form a pattern on a mask based on data files derived from the IC design layout 122. The mask can be formed in various technologies such as binary masks, phase shifting masks, and EUV masks. For example, a binary mask includes a transparent substrate (e.g., fused quartz) and an opaque material (e.g., chromium) coated on the substrate. The opaque material is patterned according to the mask data, thereby forming opaque regions and transparent regions on the binary mask. A radiation beam, such as an ultraviolet (UV) beam, is blocked by the opaque regions and transmits through the transparent regions, thereby transferring an image of the mask to a sensitive material layer (e.g., photoresist) coated on a wafer 152. For another example, a EUV mask includes a low thermal expansion substrate, a reflective multilayer (ML) over the substrate, and an absorption layer over the ML. The absorption layer is patterned according to the mask data. A EUV beam is either absorbed by the patterned absorption layer or reflected by the ML, thereby transferring an image of the mask to a sensitive material layer (e.g., photoresist) coated on the wafer 152. In some embodiments, the fab 150 may also employ some kind of maskless lithography, such as e-beam lithography. For example, one of the L1 and L2 may be e-beam lithography. In such a case, the data preparation 132 may prepare the direct-write data file for the maskless lithography and the mask fabrication 144 does not make a photomask for those particular layers to be produced by the maskless lithography.

The IC manufacturer (fab) 150, such as a semiconductor foundry, uses the masks to fabricate the IC device 160 using, for example, lithography processes. The fab 150 may include front-end-of-line (FEOL) fabrication facility, and/or back-end-of-line (BEOL) fabrication facility. Particularly, the fab 150 implements two different lithography techniques to accomplish the hybrid double patterning on the semiconductor wafer 152. For example, one lithography technique is EUV and the other is 193 nm immersion lithography, or one lithography technique is 193 nm immersion lithography and the other is traditional (or dry) 193 nm lithography. The two lithography techniques may be performed in any order. The first lithography technique is used to produce a first pattern on the wafer 152, and the second lithography technique is used to produce a second pattern on the wafer 152. The first and second patterns collectively (by addition or subtraction) form a pattern on the wafer 152. The pattern may be used in a variety of processes. For example, the pattern may be used in an ion implantation process to form various doped regions in the wafer 152, or in an etching process to form various etching regions in the wafer 152.

The wafer 152 includes a silicon substrate or other proper substrate having material layers formed thereon. Other proper substrate materials include another suitable elementary semiconductor, such as diamond or germanium; a suitable compound semiconductor, such as silicon carbide, indium arsenide, or indium phosphide; or a suitable alloy semiconductor, such as silicon germanium carbide, gallium arsenic phosphide, or gallium indium phosphide. The wafer 152 may further include various doped regions, dielectric features, and multilevel interconnects (formed at subsequent manufacturing steps).

FIGS. 2A-2D illustrate a flow chart of a method 200, constructed according to various aspects of the present disclosure. Embodiments of the method 200 may be implemented by the hybrid double patterning decomposition 134. The method 200 is an example, and is not intended to limit the present disclosure beyond what is explicitly recited in the claims. Additional operations can be provided before, during, and after the method 200, and some operations described can be replaced, eliminated, or relocated for additional embodiments of the method. The method 200 is described below in conjunction with FIGS. 3A-4P which graphically illustrate some principles of the method 200. In the following discussion, it is assumed that the hybrid double patterning lithography uses a first lithography technique L1 and a second lithography technique L2 where L1 has a higher (better) resolution than L2. In other words, the finest or smallest resolution (smallest spacing) that can be achieved by L1 is smaller than that can be achieved by L2. During wafer fabrication, L1 can be performed before or after L2 in the hybrid double patterning lithography.

Figure 2A:
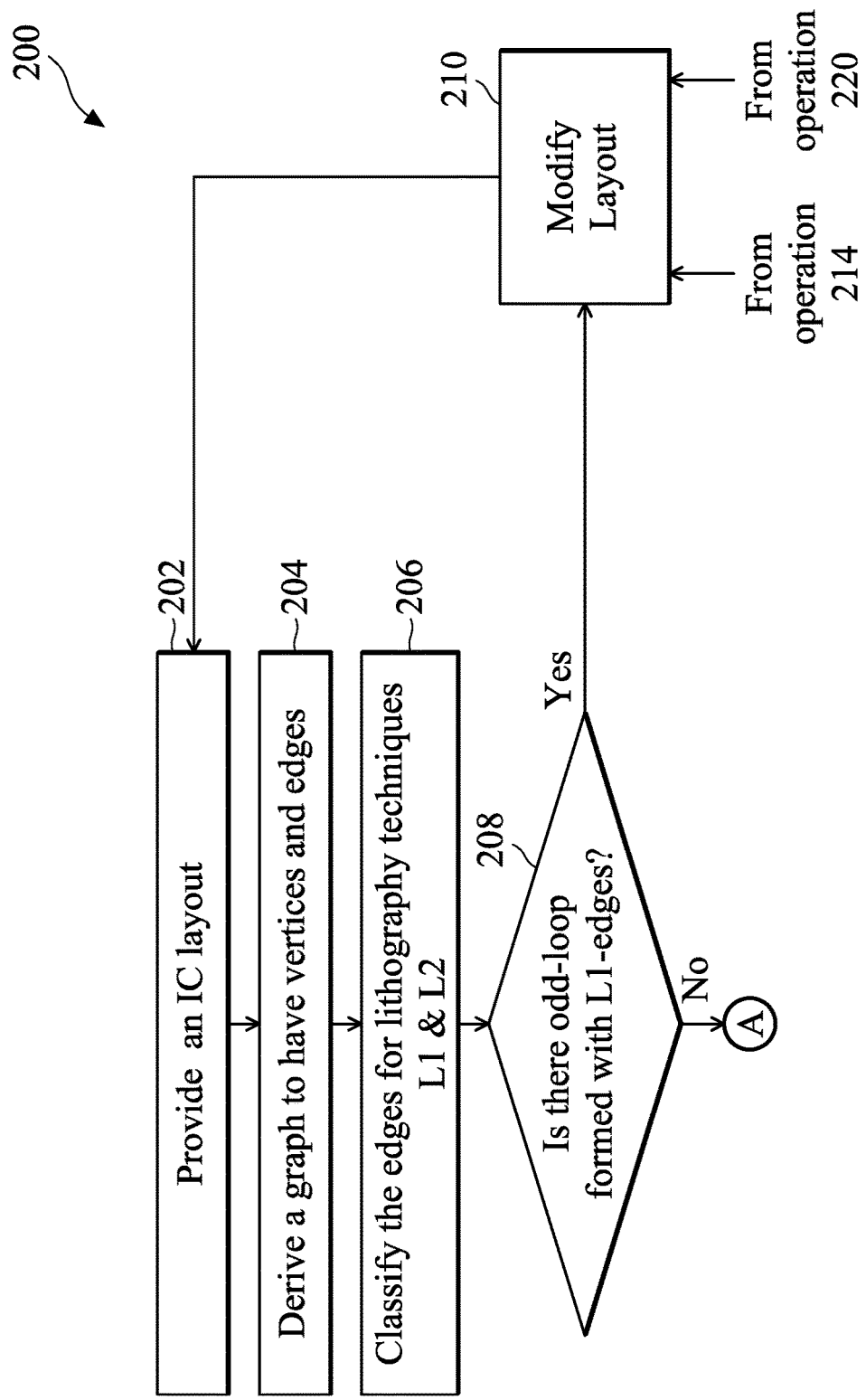
FIGS. 2A, 2B, 2C, and 2D illustrate a flow chart of a method for fabricating an IC according to various aspects of the present disclosure.
Figures 3A, 3B:
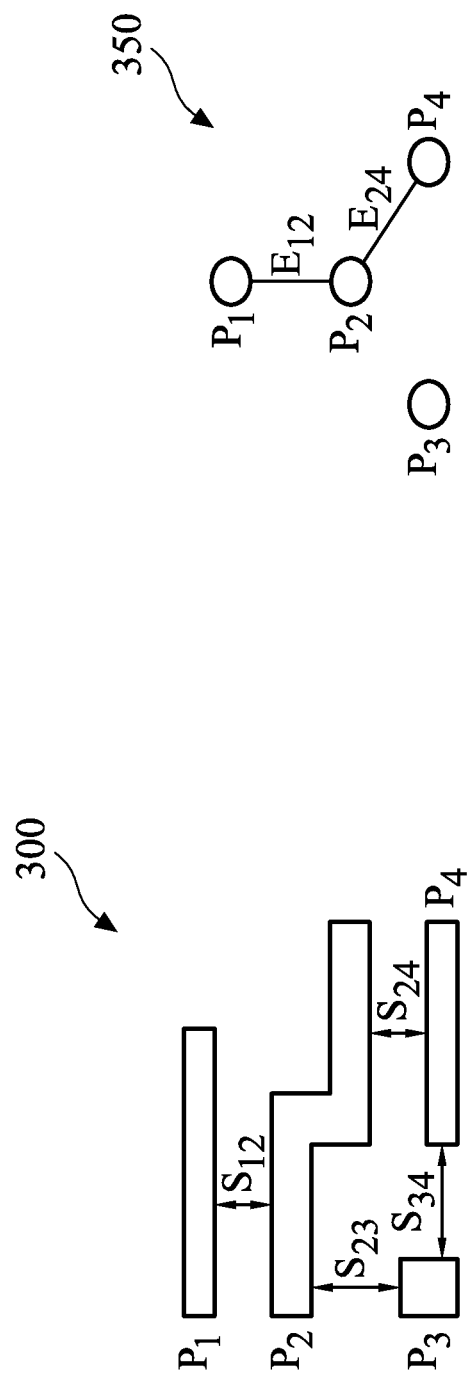
FIG. 3A illustrates an exemplary IC layout, according to aspects of the present disclosure.
FIG. 3B illustrates a graph representing the IC layout of FIG. 3A, in accordance with an embodiment.

Referring to FIG. 2A, at operation 202, the method 200 is provided with a layout of an IC. Referring to FIG. 3A, an exemplary layout 300 includes geometrical patterns (polygons in this embodiment) $P_1$, $P_2$, $P_3$, and $P_4$. Each of the patterns represent an IC feature such as an active region, a gate electrode, a source or drain feature, an isolation feature, a metal line, a contact plug, a via, or another suitable IC feature. The patterns are spaced from each other. Particularly, the patterns $P_1$ and $P_2$ are spaced by a distance (or spacing) $S_{12}$, the patterns $P_2$ and $P_3$ are spaced by a distance $S_{23}$, the patterns $P_2$ and $P_4$ are spaced by a distance $S_{24}$, and the patterns $P_3$ and $P_4$ are spaced by a distance $S_{34}$. Further, in this embodiment, the distances $S_{12}$ and $S_{24}$ are smaller than a predetermined distance X, while the distances $S_{23}$ and $S_{34}$ are equal to or greater than the predetermined distance X. X represents the finest or smallest resolution (smallest spacing) that can be achieved by the lithography technique L2 in the hybrid double patterning lithography. In other words, X is the smallest distance between adjacent IC features that can be formed by L2 without shorting these adjacent IC features together.

At operation 204, the method 200 (FIG. 2A) derives a graph representing the IC design layout. Continuing with the exemplary IC design layout 300, a graph 350 is derived as shown in FIG. 3B. The graph 350 includes vertices connected by edges. The vertices represent the patterns $P_1$ through $P_4$. For the convenience of discussion, the vertices are labeled with the same alphanumeric values as the corresponding patterns. The edges represent those distances that are smaller than X. In this embodiment, the edge $E_{12}$ represents the distance $S_{12}$, and the edge $E_{24}$ represents the distance $S_{24}$. It is noted that the vertex $P_3$ is not connected by any edges because the pattern $P_3$ is sufficiently apart from other patterns.

Figure 3C:
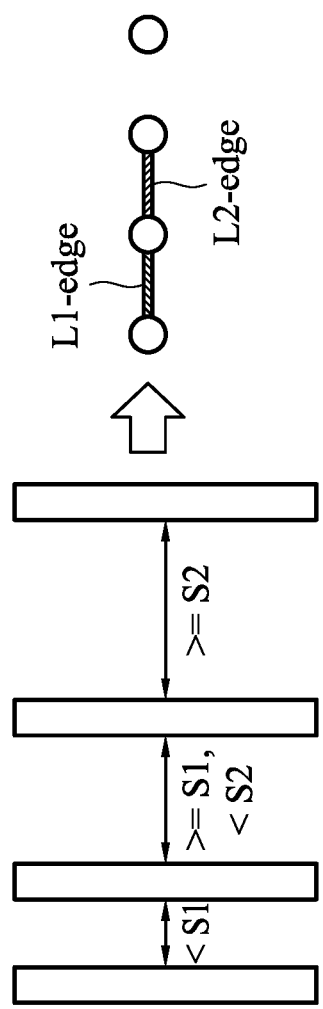
FIG. 3C illustrates an operation of classifying edges in a graph, according to aspects of the present disclosure.

At operation 206, the method 200 (FIG. 2A) classifies the edges in the graph to be either an L1-edge or an L2-edge. Referring to FIG. 3C, in the present embodiment, an edge is an L1-edge if the spacing represented by the edge is smaller than the resolution of L1, and an edge is an L2-edge if the spacing represented by the edge is greater than or equal to the resolution of L1 but smaller than the resolution of L2. As discussed above, when the spacing between two patterns is greater than or equal to the resolution of L2, there is no edge connecting the two vertices representing the two patterns. From a double patterning perspective, when an edge between two vertices is an L1-edge, the two corresponding patterns will be patterned separately by two lithography processes L1 and L2 because neither L1 nor L2 alone will be able to resolve the spacing there between. Similarly, when an edge between two vertices is an L2-edge, the two corresponding patterns will be patterned by one lithography process using L1 alone or by two lithography processes using L1 and L2 separately. By the same token, when there is no edge between two vertices, the two corresponding patterns may be patterned by one lithography process using L1 or L2 alone, or by two lithography processes using L1 and L2 separately. Applying the principles above, the operation 206 classifies the edges $E_{12}$ and $E_{24}$ of the graph 350 (FIG. 3B).

Figure 4A:
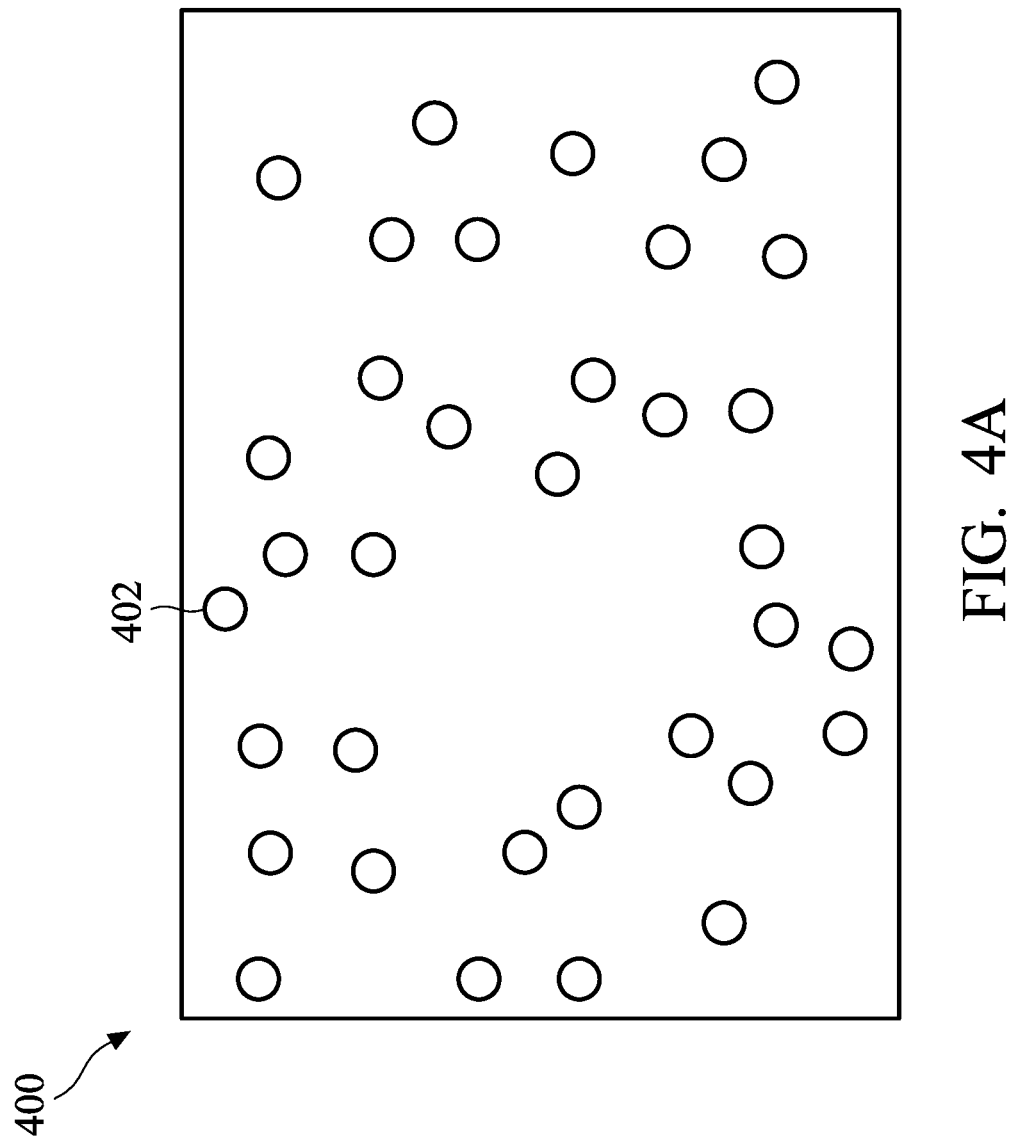
FIGS. 4A, 4B, 4C, 4D, 4E, 4F, 4G, 4H, 4I, 4J, 4K, 4L, 4M, 4N, 4O, and 4P graphically illustrate some operations of the method in FIGS. 2A-2D, in accordance with some embodiments.
Figure 4B:
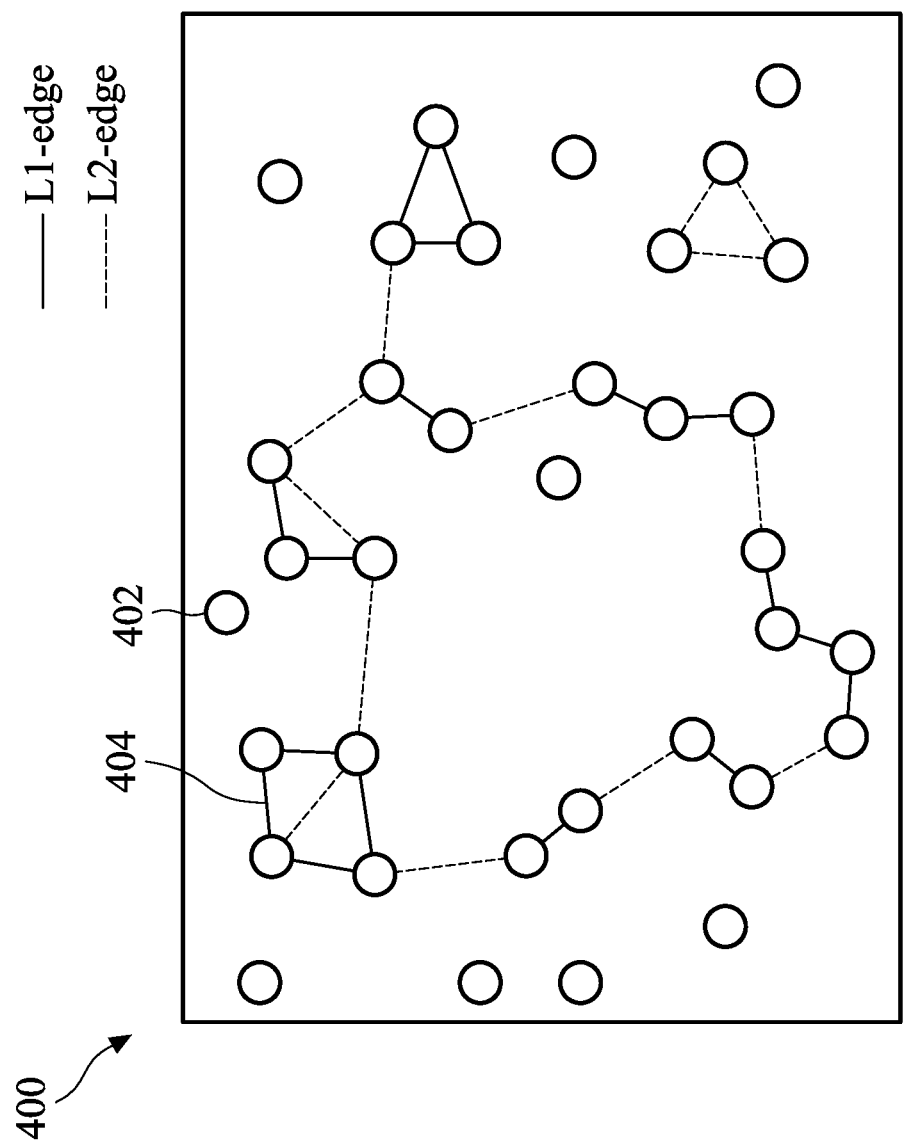

The IC layout 300 and the associated graph 350 are simple examples that can be processed by the method 200. To provide a better understanding of the principles of the present disclosure, a more complex graph 400 is presented in FIG. 4A. Referring to FIG. 4A, the graph 400 includes a plurality of vertices 402. Each of the vertices 402 represents an IC layout pattern which is generally a polygon. FIG. 4B shows edges 404 connecting some of the vertices 402. FIG. 4B further illustrates that the edges 404 are classified into two types: L1-edge (solid line) and L2-edge (broken line), as discussed with respect to FIG. 3C. The graph 400 as shown in FIG. 4B is a result of the operations 204 and 206 performed to an IC layout (not shown) received in the operation 202. Remaining operations of the method 200 are discussed using the graph 400 as an example. It is noted the graph 400 is merely an example and does not limit the present disclosure. Embodiments of method 200 may be applied to any IC layouts.

Figure 4C:
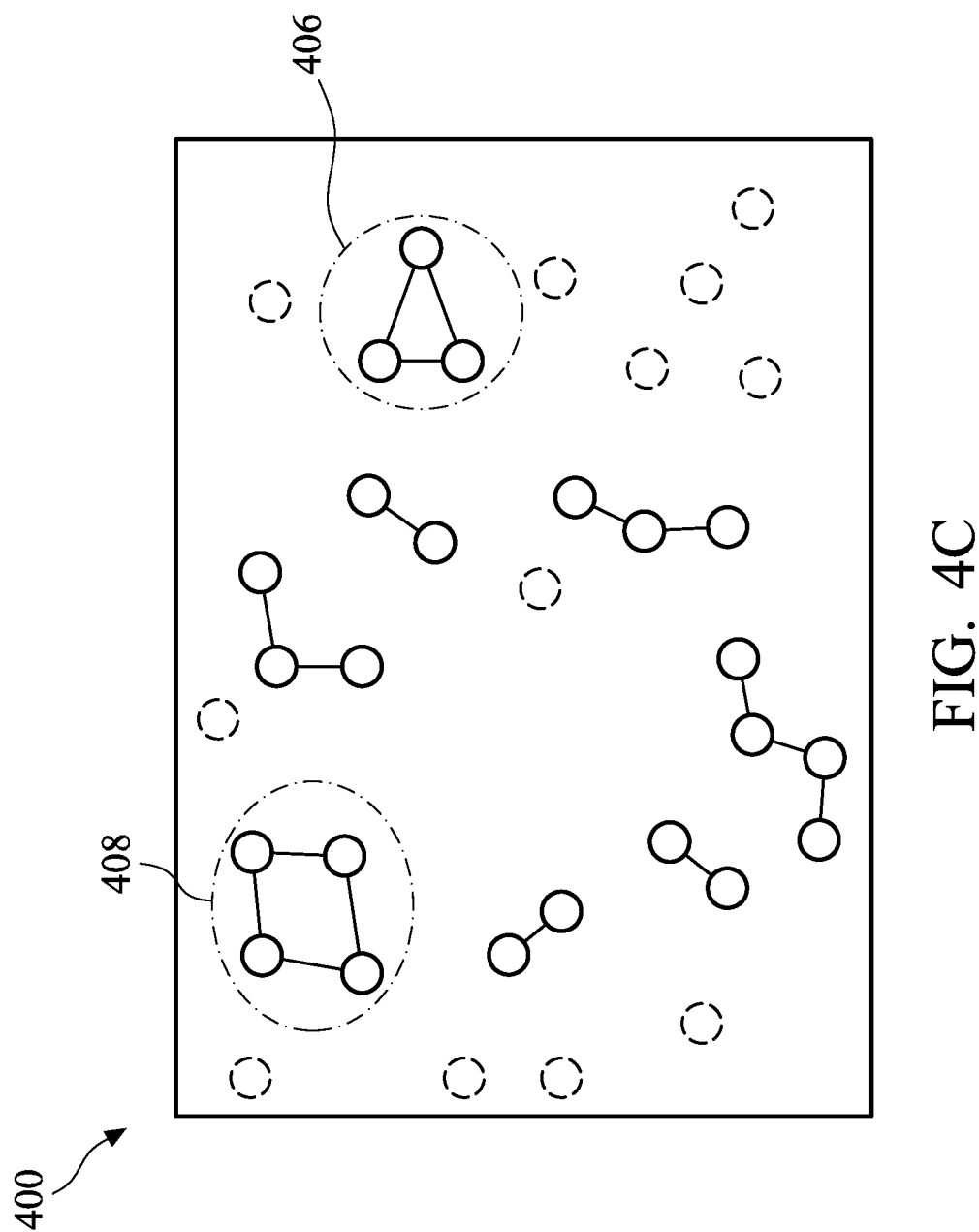

Referring to FIG. 2A, at operation 208, the method 200 checks if there is a loop formed by odd number of vertices connected by L1-edges. Such a loop is referred to as an odd-loop. FIG. 4C illustrates one such odd-loop 406. Referring to FIG. 4C, the loop 406 has three (an odd number of) vertices and all edges in the loop 406 are L1-edges. In comparison, another loop 408 is not an odd-loop because the loop has four vertices. Once an odd-loop is found, the method 200 proceeds to operation 210 to modify the IC layout to break the loop because the hybrid double patterning cannot properly resolve the IC patterns corresponding to the odd-loop. This is because two IC patterns connected by an L1-edge must be patterned by separate L1 and L2 processes (by the definition of L1-edge). Having an odd number of vertices in the loop means that some adjacent IC patterns in the loop will violate the above rule. In such a case, operation 210 may relocate the corresponding layout patterns to correct such violation. The operation 210 may be implemented by the mask house 130 or by the design house 120 (FIG. 1). Once the IC layout is modified by the operation 210, it is sent back to operation 202 and the above operations 204, 206, and 208 repeat until the graph 400 does not contain any odd-loop. From there, the operation 200 proceeds to decomposing the vertices into two subsets, one for L1 and another for L2. The decomposition includes a step of finding vertices that have to be patterned by L1 (initial assignment), followed by steps of propagating colors from those vertices fixedly assigned to L1 to the rest of the graph. The operations 212, 214, and 216 (FIG. 2B), and the operations 226, 228, 230, and 232 (FIG. 2C), are two alternative embodiments for figuring out which vertices (corresponding IC patterns) will be patterned by the lithography process L1 (the initial assignment). The operations 218, 220, and 222 (FIG. 2D) then propagate colors from those initial assignment to the rest of the graph.

Figure 2B:
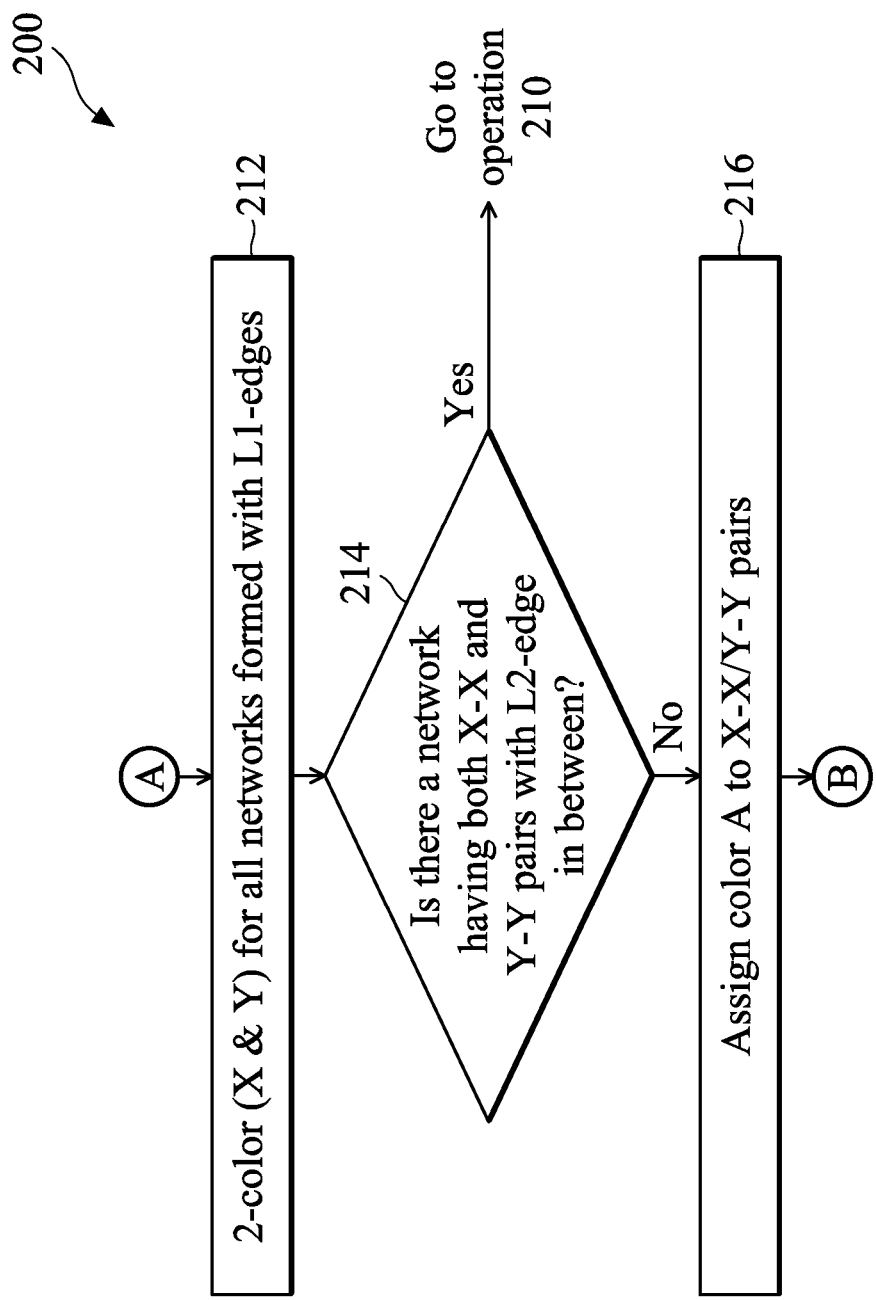

In the first embodiment, the method 200 performs the operations 212, 214, and 216 to find out which IC patterns will be patterned by the lithography process L1. Referring to FIG. 2B, at operation 212, the method 200 performs 2-coloring (e.g., using color "X" and color "Y") to all vertices connected by L1-edges. This involves multiple steps, as discussed below.

Figure 4D:
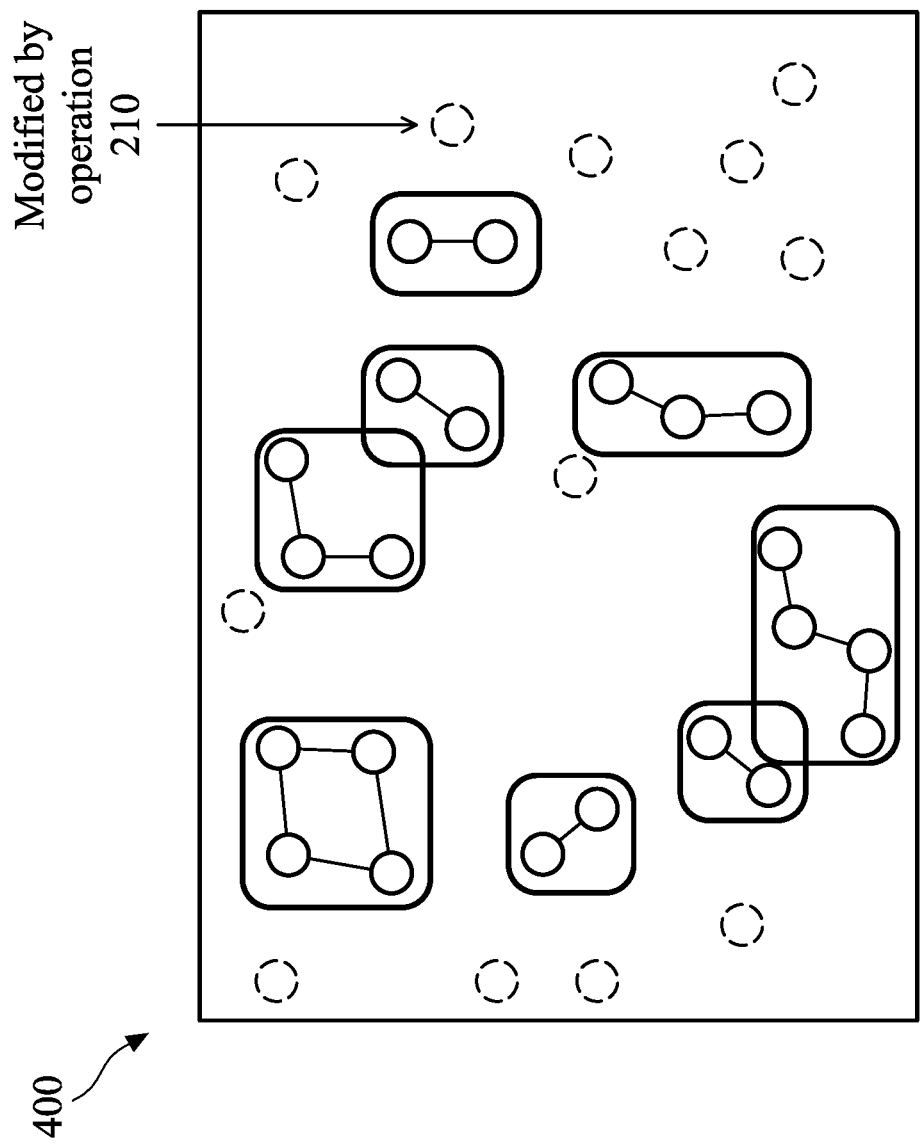
Figure 4E:
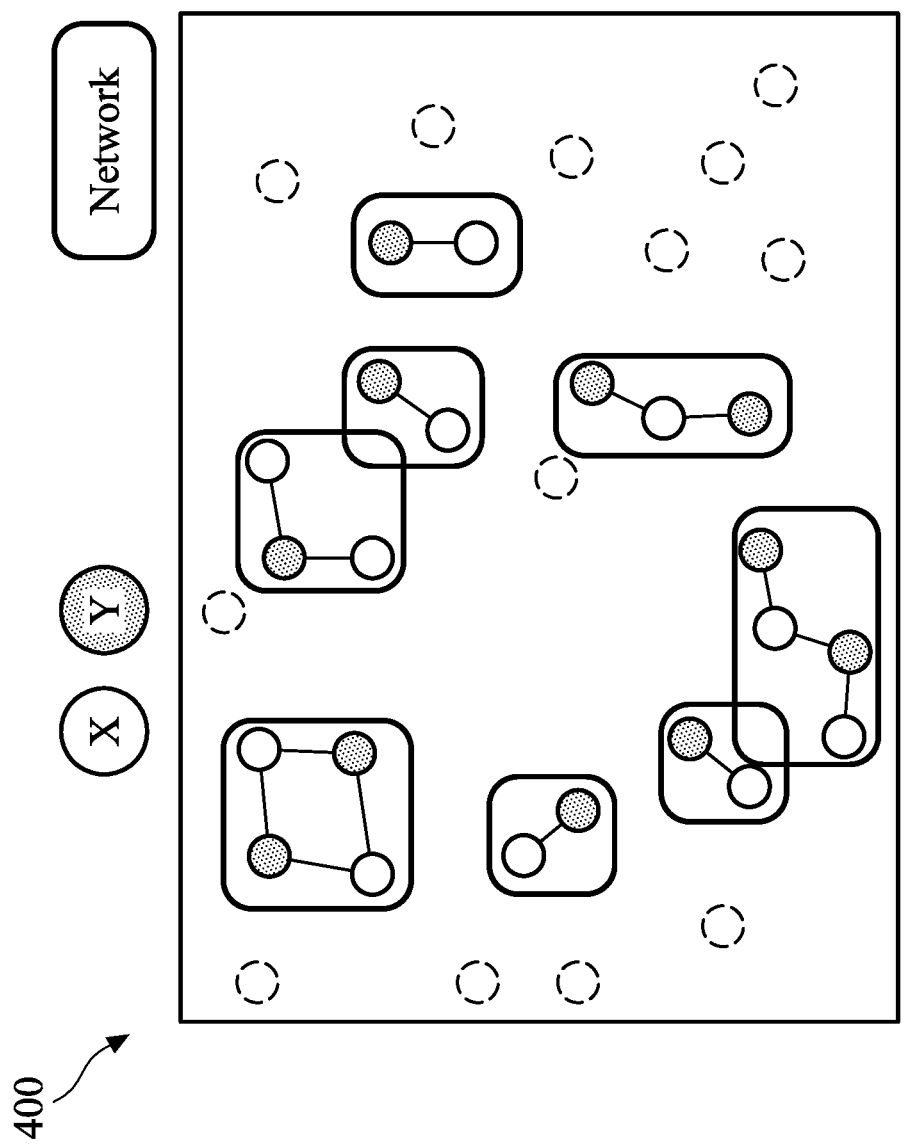
Figure 4G:
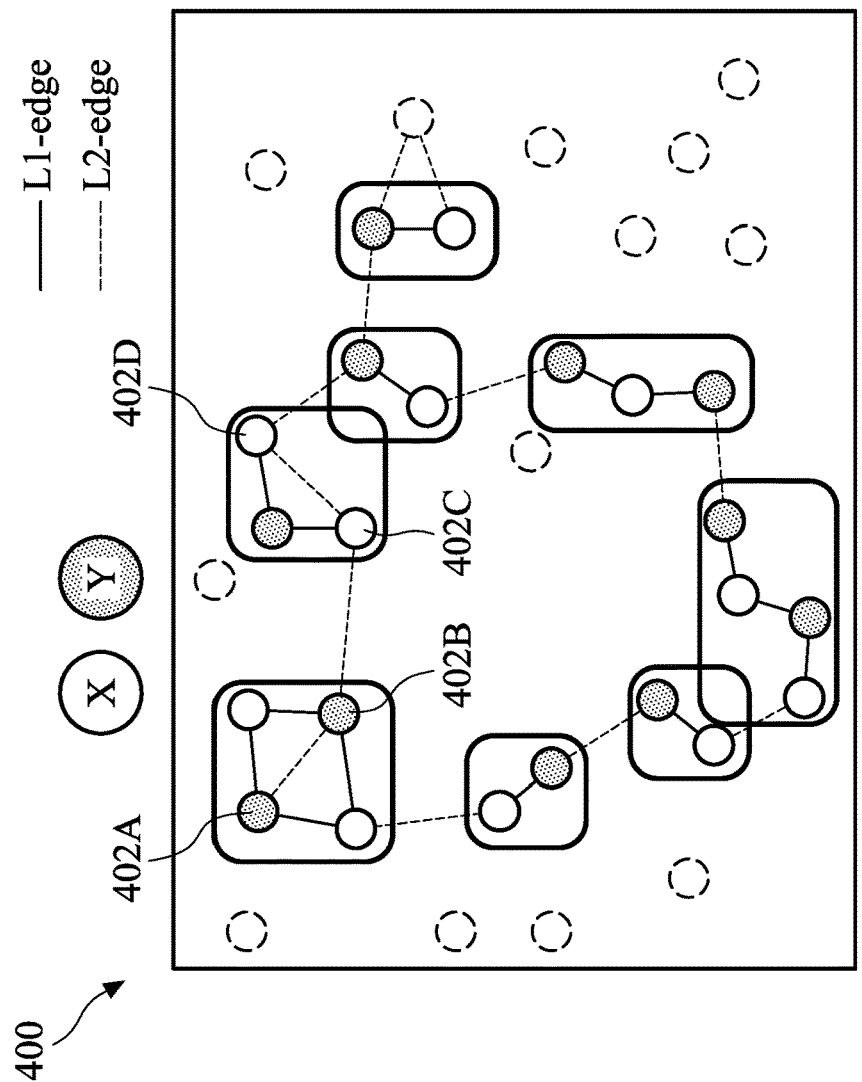

Referring to FIG. 4D, the operation 212 identifies "networks." A network comprises of vertices and only L1-edges connecting the vertices. In other words, the operation 212 ignores the L2-edges when identifying networks. It is also noted that the IC layout 122 has been modified to break the odd-loop 406 (FIG. 4C) in the graph 400. Referring to FIG. 4E, operation 212 colors the vertices within each network using colors X and Y wherein two vertices connected by a common L1-edge are assigned with different colors.

Figure 4F:
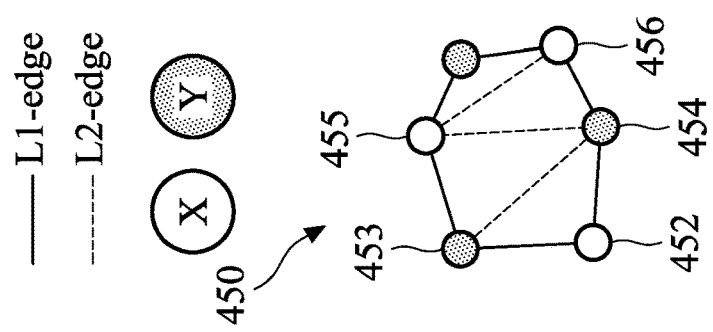

At operation 214, the method 200 (FIG. 2B) checks whether there is a network that have both an X-X pair and a Y-Y pair. As used herein, an "X-X pair" refers to two vertices within a network that are colored with X and are connected by an L2-edge, and a "Y-Y pair" refers to two vertices within a network that are colored with Y and are connected by an L2-edge. FIG. 4F shows one example network 450 that satisfies the above condition where vertices 453 and 454 form a Y-Y pair and vertices 455 and 456 form an X-X pair. Having such X-X and Y-Y pairs in the same network indicates that the IC layout corresponding to the network may not be correctly patterned by the hybrid double patterning lithography. Taking the network 450 as an example, if the vertex 452 is assigned with L1 (i.e., the IC pattern corresponding to the vertex 452 is patterned by L1 lithography), then the vertices 453 and 454 will have to be assigned with L2, which is a violation of the manufacturing rule because spacing between the two cannot be properly resolved by L2 lithography (by the definition of L2-edge). On the other hand, if the vertex 452 is assigned with L2 and the vertices 453 and 454 are assigned with L1, then the vertices 455 and 456 will have to be assigned with L2, which is again a violation of the manufacturing rule.

Figure 4H:
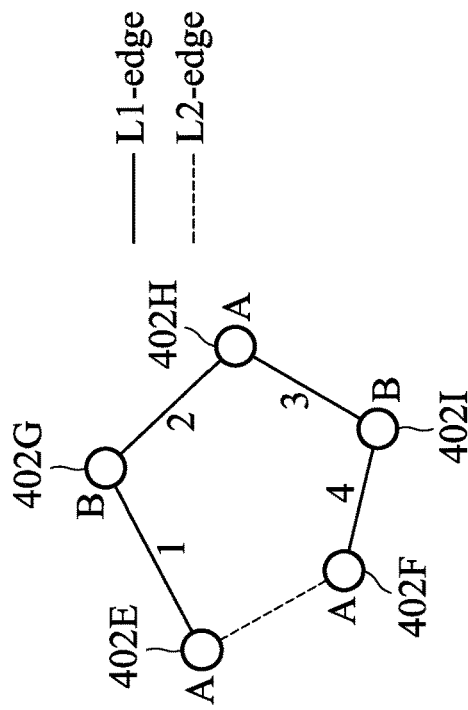
Figure 4I:
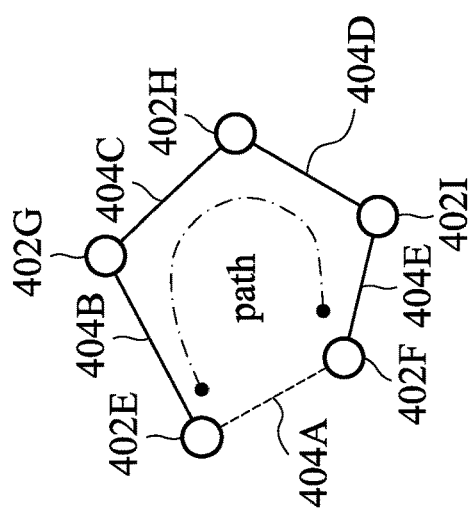
Figure 4J:
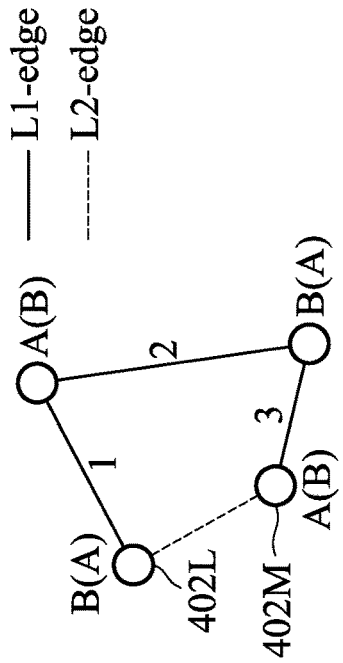
Figure 4K:
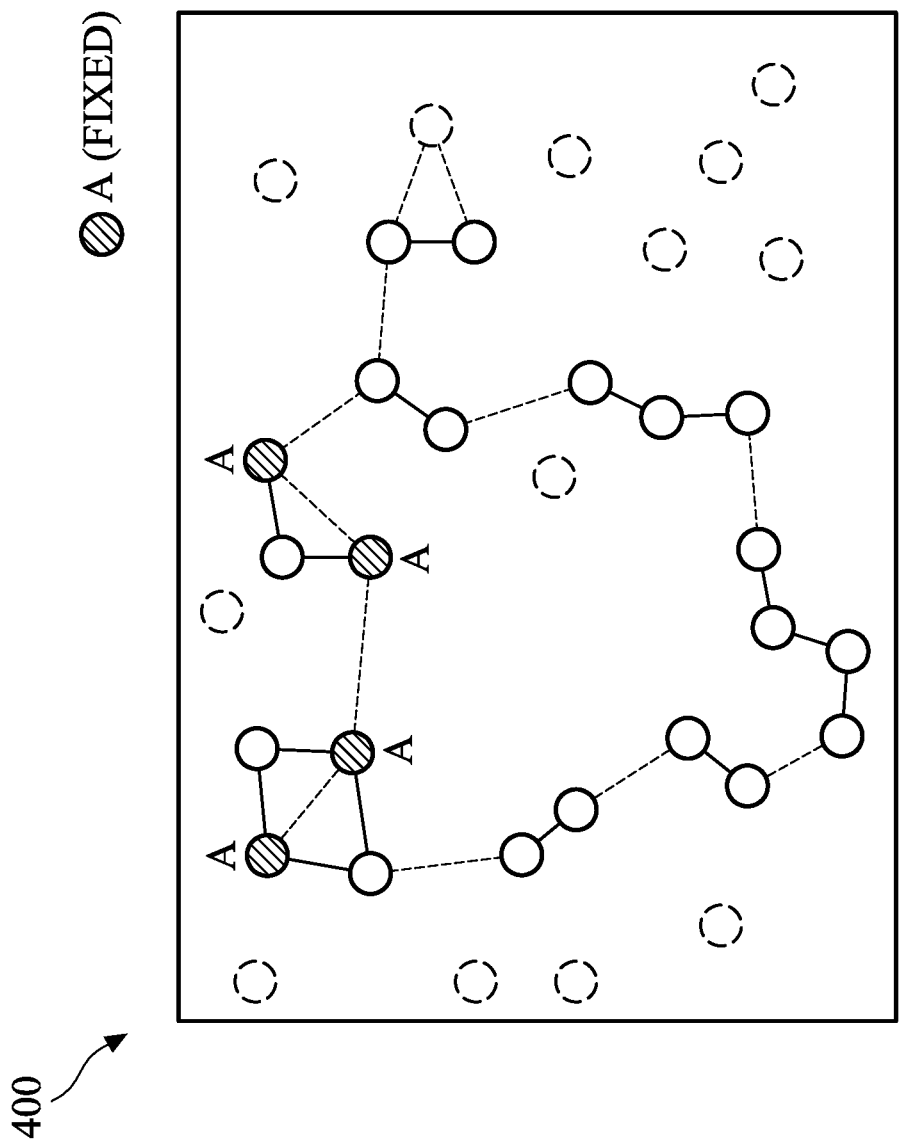

Once the operation 214 finds such a violation, the method 200 (FIG. 2B) proceeds to operation 210 to modify the IC layout 122 to prevent such X-X and Y-Y pairs in the same network. For example, operation 210 may relocate the corresponding layout patterns to correct such violation. If no such violation is found, the method 200 (FIG. 2B) proceeds to operation 216 to assign color "A" to any X-X pair(s) and Y-Y pair(s) in the networks. A vertex with color A indicates that the corresponding IC pattern is to be produced by L1 lithography in the fab 150. In the graph 400 shown in FIG. 4G, the vertices 402A and 402B form a Y-Y pair, the vertices 402C and 402D form an X-X pair. Therefore, the vertices 402A, 402B, 402C and 402D are assigned with the color A. The results are shown in FIG. 4K. The vertices 402A, 402B, 402C and 402D serve as the starting (or initial) point of coloring the graph 400 with color A and color B. A vertex with color B indicates that the corresponding IC pattern is to be produced by L2 lithography in the fab 150.

Figure 2C:
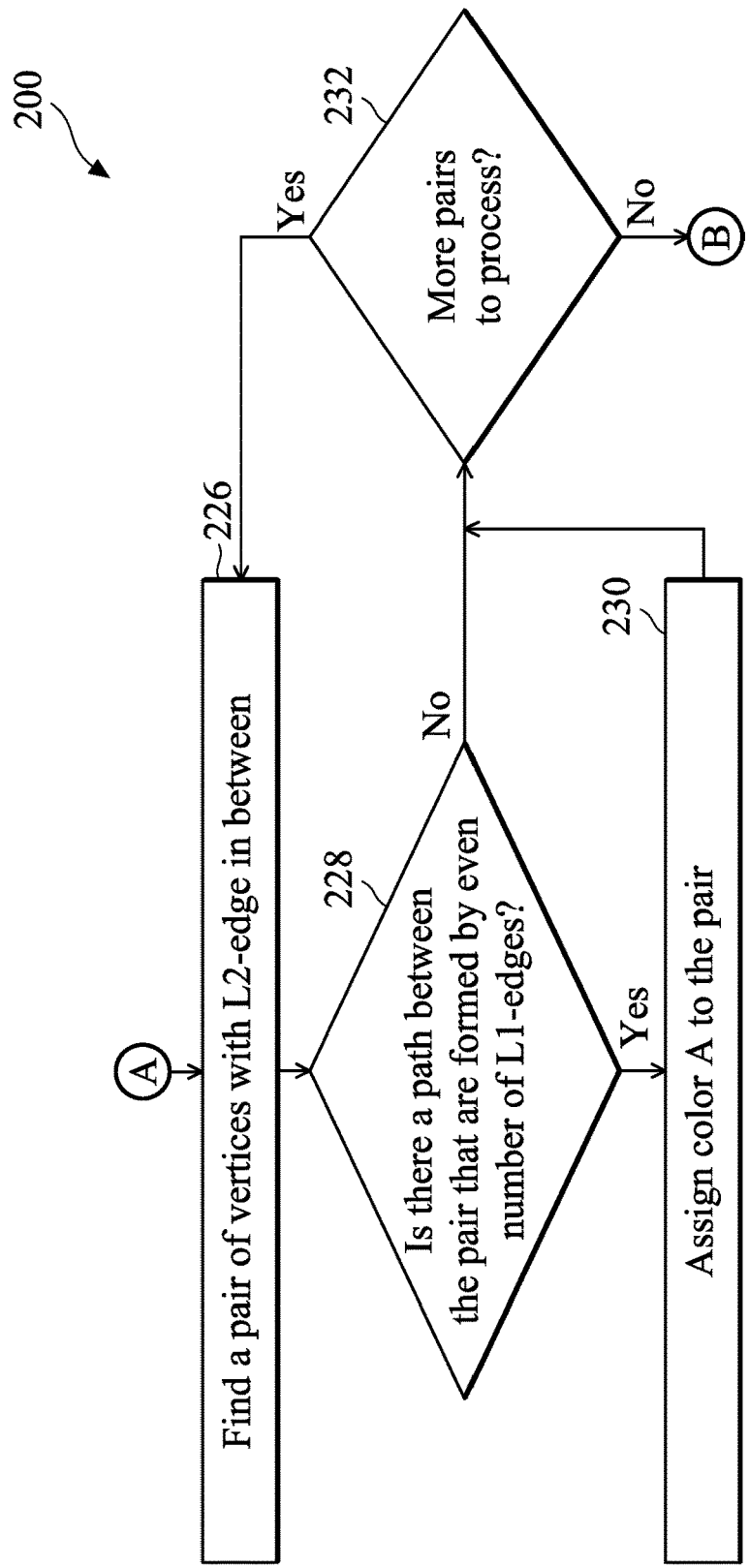
Figure 2D:
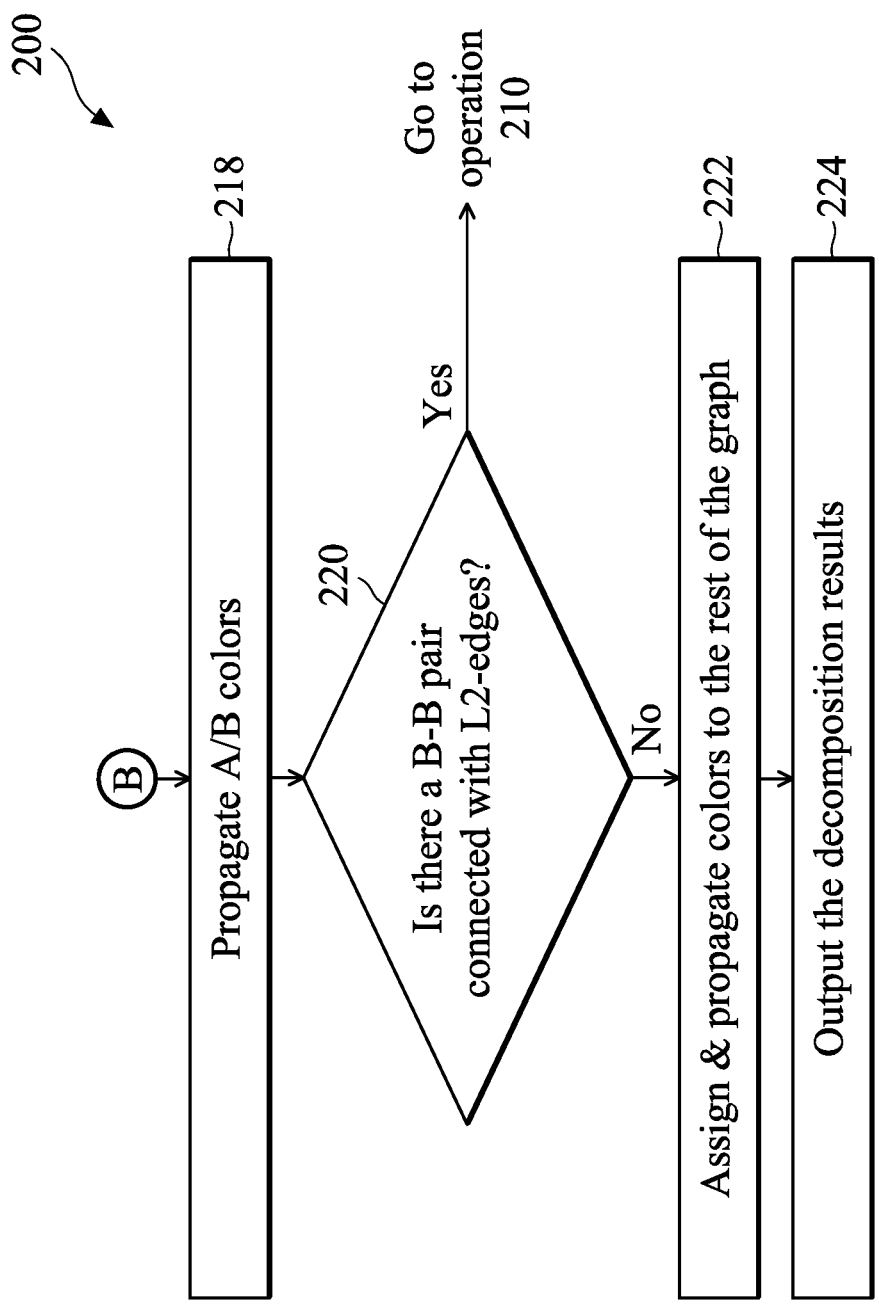

FIG. 2C illustrates an alternative embodiment of initially coloring vertices with color A. Referring to FIG. 2C, the method 200 proceeds from the operation 208 to the operation 226. At operation 226, the method 200 finds a pair of vertices connected directly by an L2-edge. There may be many such pairs in the graph 400. The method 200 may process one pair at a time or multiple pairs simultaneously. For a given pair of vertices connected by an L2-edge, the method 200 checks (operation 228) if there is a path between the two vertices that are formed by even number of L1-edges. If the answer is yes, the method 200 assigns the vertices with color A at operation 230 and proceeds to operation 232. If the answer is no, the method 200 proceeds to operation 232. If there are more pairs to be processed (operation 232), the method 200 goes back to the operation 226 and the above operations repeat. FIGS. 4H, 4I, and 4J illustrate the above operations.

Referring to FIG. 4H, the method 200 finds a pair of vertices 402E and 402F at the operation 226. The vertices 402E and 402F are connected directly by an L2-edge 404A. At the operation 228, the method 200 finds that the vertices 402E and 402F are also connected by a path that comprises of L1-edges only, namely 404B, 404C, 404D, and 404E. Further, the number of L1-edges in the path is an even number, namely 4. Therefore, the pair of vertices 402E and 402F satisfies the condition of the operation 228. The method 200 then assigns color A to the vertices 402E and 402F at the operation 230. In another example shown in FIG. 4I, even though vertices 402J and 402K are connected directly by an L2-edge, there is no path between the two vertices that comprises L1-edges only. Therefore, the vertices 402J and 402K are not colored with color A at the operation 230. In yet another example as shown in FIG. 4J, vertices 402L and 402M are connected directly by an L2-edge, and there is also a path between the two vertices that comprises L1-edges only. But the number of L1-edges in the path is not an even number. Therefore, the vertices 402L and 402M are not colored with color A at the operation 230. In fact, the vertices 402L and 402M may be colored with colors A and B respectively, or colors B and A respectively.

From either the operation 216 or the operation 232, the method 200 proceeds to operation 218 (FIG. 2D) to color the rest of vertices in the graph based on the initial coloring of color A as discussed above. It is noted that the method 200 may employ other embodiments (alternative to the operations 212/214/216 and the operations 226/228/230/232) to find out which vertices are to be assigned with color A.

Figure 4M:
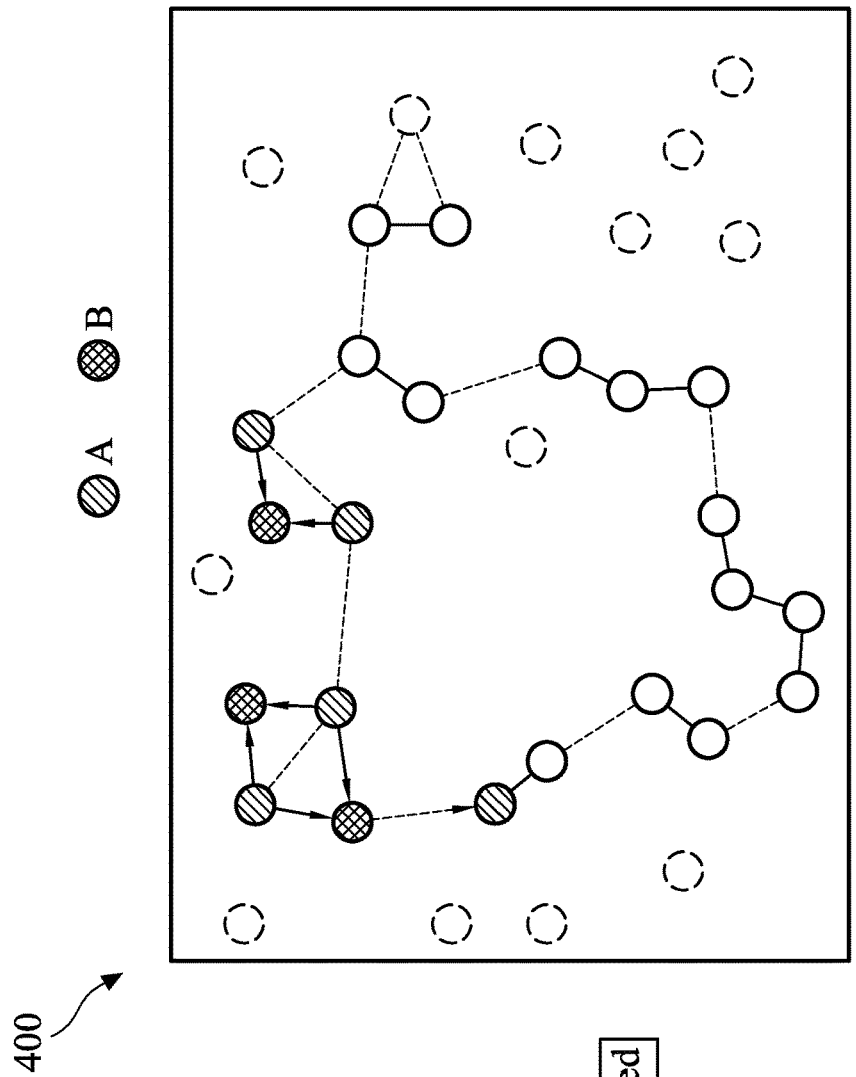
Figure 4L:
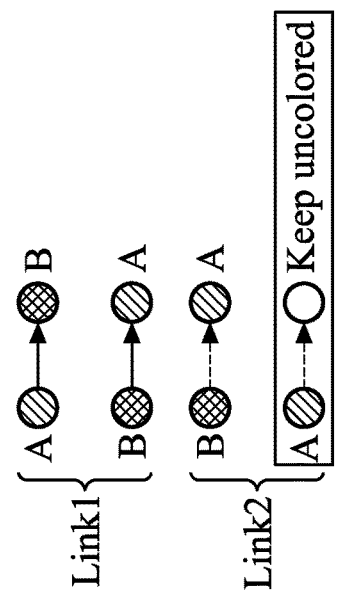

In the present embodiment, the operation 218 colors the vertices in the graph 400 based on the following rules (1)-(4) as illustrated in FIG. 4L: (1) if a vertex is colored with color A, then its immediate neighbor is colored with color B if the vertex and the immediate neighbor are connected by an L1-edge; (2) if a vertex is colored with color B, then its immediate neighbor is colored with color A if the vertex and the immediate neighbor are connected by an L1-edge; (3) if a vertex is colored with color B, then its immediate neighbor is colored with color A if the vertex and the immediate neighbor are connected by an L2-edge; and (4) if a vertex is colored with color A, then its immediate neighbor is temporarily not colored if the vertex and the immediate neighbor are connected by an L2-edge. For vertices that are not colored due to the rule (4), either color A or color B can be assigned (at a later coloring step), which can be utilized by the method 200 to provide process friendliness such as balancing the pattern loading of the two subsets for mask fabrication, balancing the pattern loading on the wafer during the L1 and L2 lithography processes, and avoiding some unwanted configuration on the same mask.

Figure 4N:
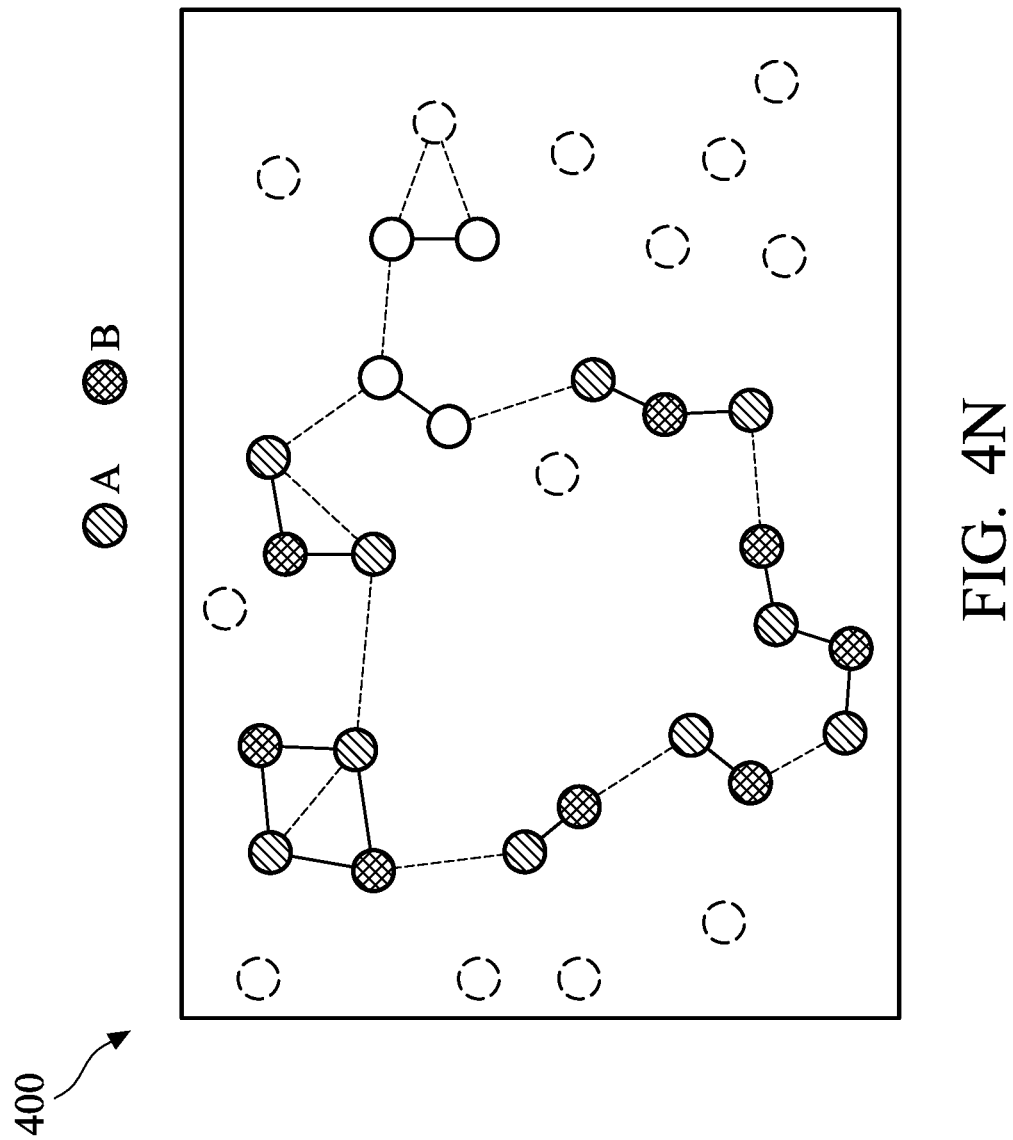

Based on the above rules and the vertices that are initially colored with color A (e.g., by the operations 212/214/216 or the operations 226/228/230/232), the operation 218 progressively assigns colors to the vertices in the graph 400 as shown in FIGS. 4M and 4N. After the operation 218 finishes, the method 200 checks (operation 220 in FIG. 2D) if there is a pair of vertices that are colored with color B and are connected directly with an L2-edge. Such a pair indicates a violation of the manufacturing rules because the corresponding IC patterns are to be patterned by L2 lithography (indicated by color B) but cannot be properly resolved by L2 lithography (indicated by L2-edge). If the operation 220 finds such a pair, the method 200 proceeds to the operation 210 to modify the IC layout 122 to prevent the violation, for example, by relocating the corresponding IC patterns in the layout 122. If the operation 220 does not find such a pair, the method 200 proceeds to operation 222 to complete the coloring process.

Figure 4O:
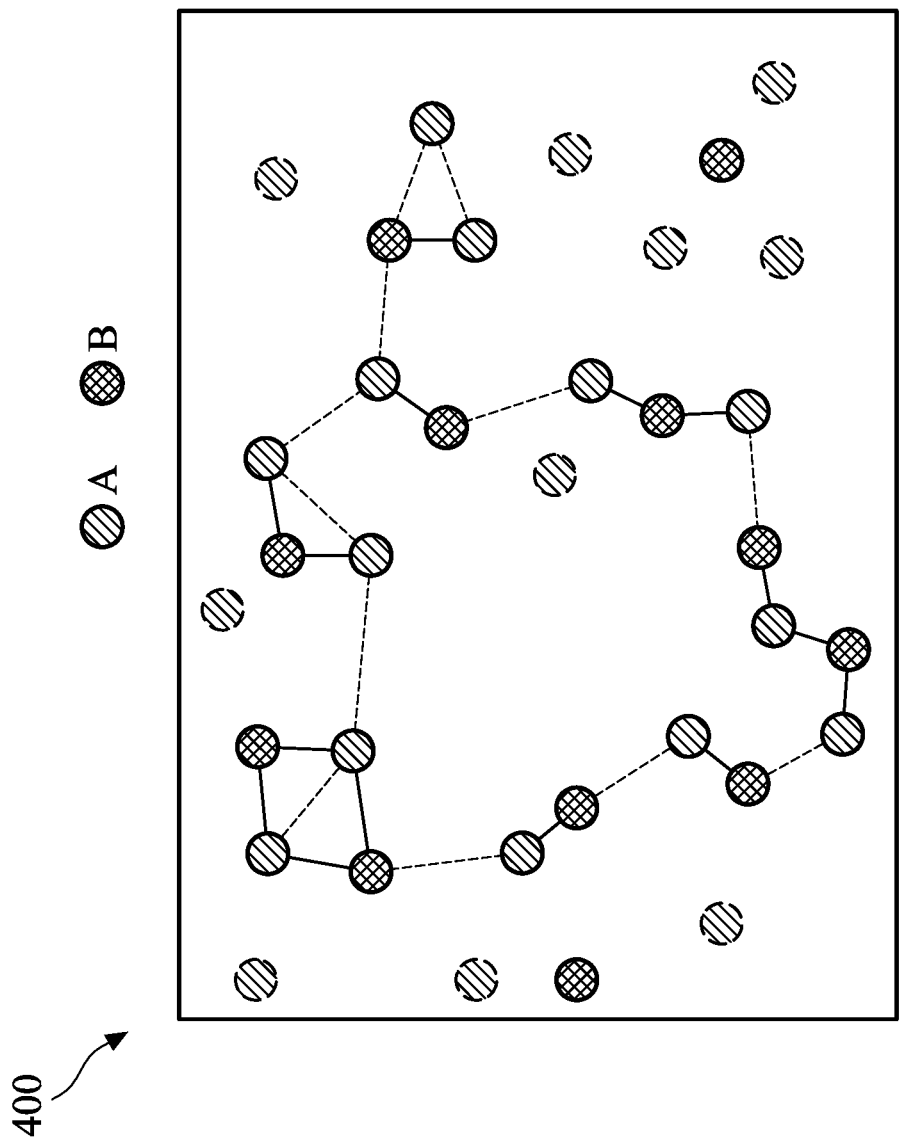

As illustrated in FIG. 4N, some vertices in the graph 400 are not colored after the operation 218 finishes. This may be due to a couple of reasons. For example, some vertices may not be connected to a network that has some vertices initially colored with the color A so that the coloring process of the operation 218 does not propagate to these vertices. For another example, due to the rule (4) discussed in the operation 218, some vertices are intentionally not colored by the operation 218 so that some process friendliness can be provided by the method 200. At the operation 222, the method 200 (FIG. 2D) assigns colors to these vertices with the consideration of process friendliness. For vertices that are isolated (not connected to other vertices through any edges), the method 200 may assign arbitrarily color A or color B to them with the consideration of process friendliness. For vertices that are in a network, the method 200 may arbitrarily pick a starting point by assigning color A or color B to any of the vertices, and then propagate the colors to the rest of the vertices in the network. FIG. 4O illustrates the complete color assignment to the graph 400 in accordance with an embodiment.

At operation 224, the method 200 outputs the results (color assignment) of the decomposition. The first subset of IC patterns corresponding to vertices colored with color A are output for L1 lithography, and the second subset of IC patterns corresponding to vertices colored with color B are output for L2 lithography. The first and second subsets may be stored in a tangible computer-readable medium for the mask fabrication 144 or other IC processing facilities. The tangible computer-readable medium may include a floppy disc, a hard disc, an optical disk, a magneto-optical disc, a solid-state storage device, or other suitable storage medium. The data preparation 132 may perform further processes to the first and second subsets of IC patterns based on the requirement of L1 and L2 lithography processes. For example, the data preparation 132 may perform optical proximity correction (OPC), off-axis illumination, sub-resolution assist features, other suitable techniques, or combinations thereof to the first and second subsets of IC patterns separately.

Figure 4P:
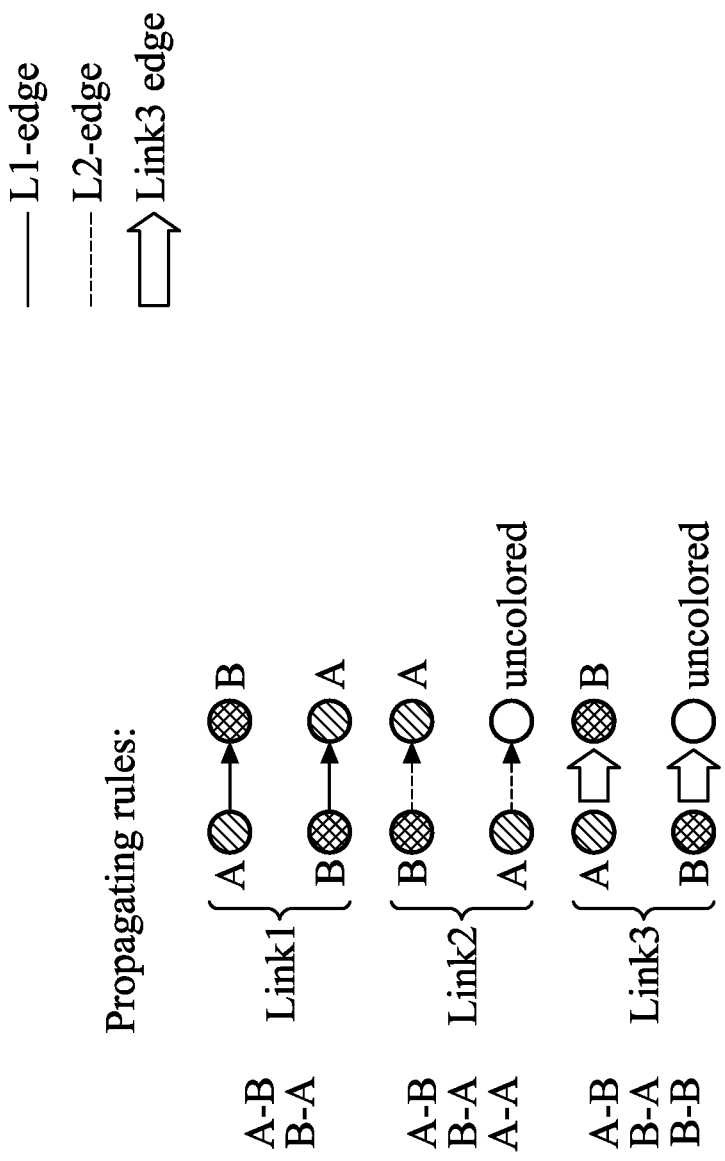

In the above discussion, the method 200 classifies edges into two types: L1-edge and L2-edge (operation 206). In another embodiment, the method 200 may employ more than two types of edges. For example, in addition to L1-edge and L2-edge, the method 200 may use a third type of edge: link3 as indicated in FIG. 4P. For example, there may exist two IC patterns that can be resolved (or patterned) by either L1 lithography or L2 lithography resolution-wise. However, they are preferred to be patterned by L2 lithography for better process performance, such as higher contrast during photo exposure. To further this embodiment, the rules discussed in the operation 218 may be expanded to accommodate this third type of edge, e.g., by adding two rules (5) and (6) below: (5) if a vertex is colored with color A, then its immediate neighbor is colored with color B if the vertex and the immediate neighbor are connected by a link3 edge; (6) if a vertex is colored with color B, then its immediate neighbor is temporarily not colored if the vertex and the immediate neighbor are connected by a link3 edge. All operations of the method 200 may remain the same except that the operation 218 follows the rules (1)-(6) in this embodiment.

Figure 5:
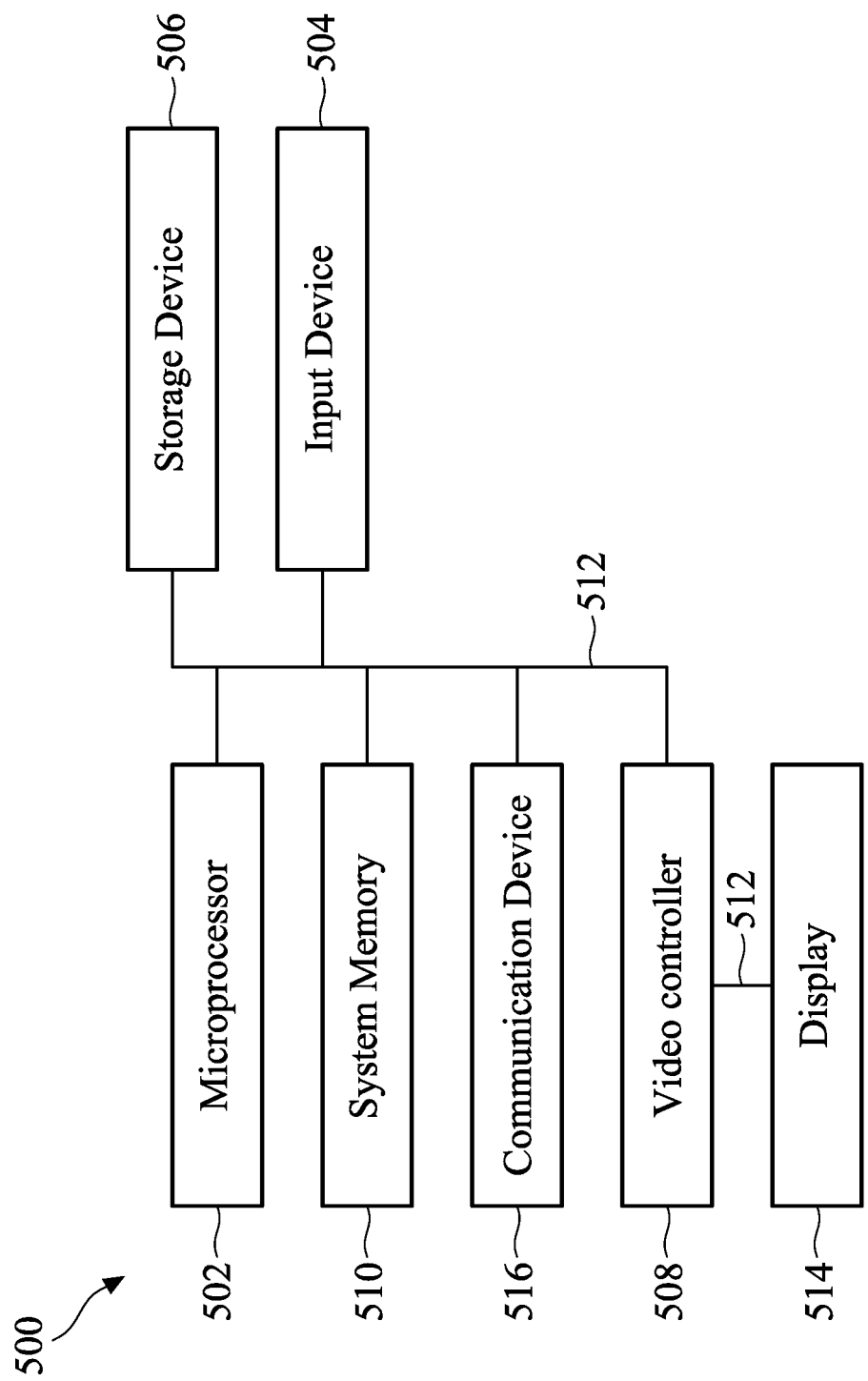
FIG. 5 illustrates a block diagram of a computerized IC tool for carrying out operations of the method of FIGS. 2A-2D, in accordance with some embodiments.

Referring now to FIG. 5, shown therein is an illustrative computerized IC tool 500 for implementing embodiments of the method 200 described above. The computerized IC tool 500 may be a design tool used by the design house 120 or a mask data preparation tool used by the mask house 130 (FIG. 1). The computerized IC tool 500 includes a microprocessor 502, an input device 504, a storage device 506, a video controller 508, a system memory 510, a display 514, and a communication device 516, all interconnected by one or more buses 512. The storage device 506 could be a floppy drive, hard drive, CD-ROM, optical drive, or any other form of storage device. In addition, the storage device 506 may be capable of receiving a floppy disk, CD-ROM, DVD-ROM, or any other form of computer-readable medium. In one example, the input device 504 and the storage device 506 collectively receive a design layout (e.g., the design layout 122). In an embodiment, the storage device 506 may contain computer-executable instructions which, when read by the microprocessor 502, cause the microprocessor 502 to perform the method 200 as discussed above. Further, the communication device 516 could be a modem, network card, or any other device to enable the IC tool 500 to communicate with other tools.

The computerized IC tool 500 may implement the method 200 using hardware, software, or a combination thereof. Exemplary hardware includes processor-capable platforms, such as personal computers or servers, and hand-held processing devices such as smart phones, tablets, and personal digital assistants. Further, hardware may include other physical devices that are capable of executing machine-readable instructions, such as field programmable gate array (FPGA) and application specific integrated circuits (ASIC). Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

Combinations of software and hardware could also be used for providing enhanced functionality and performance for certain embodiments of the present disclosure. One example is to directly manufacture software functions into a silicon chip such as an FPGA or an ASIC. Accordingly, it should be understood that combinations of hardware and software are also included within the definition of the computerized IC tool 500 and are thus envisioned by the present disclosure as possible equivalent structures and equivalent methods.

Computer-readable mediums in the present disclosure include passive data storage, such as a random access memory (RAM) as well as semi-permanent data storage such as a compact disk read only memory (CD-ROM). In addition, an embodiment of the present disclosure may be embodied in the RAM of a computer to transform a standard computer into the computerized IC tool 500.

The computerized IC tool 500 may be designed to work on any specific architecture. For example, the computerized IC tool 500 may be designed to work on a single computer, local area networks, client-server networks, wide area networks, internets, hand-held and other portable and wireless devices and networks.

Although not intended to be limiting, the present disclosure provides many benefits to semiconductor manufacturing processes. For example, embodiments of the present disclosure provide methods for hybrid double patterning which may take advantages of a higher resolution of a lithography process and low costs of another lithography process. Embodiments of the present disclosure provide efficient ways of decomposing an IC layout for hybrid double patterning, including checking potential violations of manufacturing rules at an early stage of fabrication. Embodiments of the provided methods can be easily integrated into existing design and fabrication flow.

In one exemplary aspect, the present disclosure is directed to a method of fabricating an integrated circuit (IC) with a first lithography technique and a second lithography technique different from the first lithography technique. The method includes providing a layout of the IC, the layout having a set of IC patterns; and deriving a graph from the layout, the graph having vertices and edges that connect some of the vertices, the vertices representing the IC patterns, the edges being classified into at least two types, a first type of edges connecting two vertices that are to be patterned separately with the first and second lithography techniques, a second type of edges connecting two vertices that are to be patterned in a same process using the first lithography technique or to be patterned separately with the first and second lithography techniques. The method further includes decomposing, using a computerized IC tool, the vertices into a first subset and a second subset, wherein the IC patterns corresponding to the first subset are to be patterned on a wafer using the first lithography technique, and the IC patterns corresponding to the second subset are to be patterned on the wafer using the second lithography technique.

In an embodiment, after the step of deriving, the method further includes checking if there is a loop formed by odd number of vertices connected by edges of the first type; and on condition that there is such a loop, modifying the layout to break the loop.

In an embodiment, after the step of deriving, the method further includes assigning colors X and Y to all vertices that are connected by edges of the first type, wherein two vertices connected by a common edge of the first type are assigned with different colors. In a further embodiment, after the step of assigning colors X and Y, the method further includes identifying a network of vertices that are connected to each other through edges of the first type; checking if there are two pairs of vertices in the network such that a first pair are assigned with the same color X and are connected directly by an edge of the second type and a second pair are assigned with the same color Y and are connected directly by another edge of the second type; and on condition that there are such two pairs, modifying the layout to prevent such two pairs. In another further embodiment, after the step of assigning colors X and Y, the method further includes assigning initially color A to all pairs of vertices that are assigned with the same color X or same color Y and are connected directly by an edge of the second type; and placing vertices with color A into the first subset. After the step of assigning initially color A, the method may further include assigning color B to all vertices that are not colored with colors A or B and are connected to vertices with color A directly by an edge of the first type; after the step of assigning color B, assigning subsequently color A to all vertices that are not colored with colors A or B and are connected to vertices with color B directly by an edge of the first or second type; repeating the steps of assigning color B and assigning subsequently color A to rest of the vertices in the graph; and placing vertices with color A into the first subset and vertices with color B into the second subset.

In a further embodiment, after the step of repeating, the method may include checking if there is a pair of vertices that are colored with color B and are connected by an edge of the second type; and on condition that such pair exists, modifying the layout. Alternatively, after the step of repeating, the method may include, on condition that there are vertices that are not colored with either color A or color B, assigning color A or color B to the vertices to balance mask loading between the first and second subsets.

In another alternative embodiment, after the step of repeating, the method further includes fabricating a first photomask with the IC patterns corresponding to the first subset of vertices; and fabricating a second photomask with the IC patterns corresponding to the second subset of vertices. Furthermore, the method may include performing a first lithography process to a wafer using the first lithography technique to produce a first subset of etch mask patterns corresponding to the first subset of vertices; performing a second lithography process to the wafer using the second lithography technique to produce a second subset of etch mask patterns corresponding to the second subset of vertices; and etching the wafer using both the first and the second subsets of etch mask patterns.

In an embodiment, after the step of deriving, the method further includes locating a pair of vertices connected by an edge of the second type; checking if there is a path between the pair of vertices through only edges of the first type; on condition that such a path exists and the number of edges of the first type on the path is even, assigning initially color A to the pair of vertices; and placing vertices with color A into the first subset. In a further embodiment, after the step of assigning initially color A, the method includes assigning color B to all vertices that are not colored with colors A or B and are connected to vertices with color A directly by an edge of the first type. After the step of assigning color B, the method further includes assigning, subsequently, color A to all vertices that are not colored with colors A or B and are connected to vertices with color B directly by an edge of the first or second type; repeating the steps of assigning color B and assigning subsequently color A to rest of the vertices in the graph; and placing vertices with color A into the first subset and vertices with color B into the second subset.

In another exemplary aspect, the present disclosure is directed to a method of fabricating an integrated circuit (IC) with a first lithography technique and a second lithography technique having a lower resolution than the first lithography technique. The method includes providing a layout of the IC, the layout having a set of IC patterns; deriving a graph from the layout by representing the IC patterns with vertices and representing spacing between IC patterns with edges connecting the corresponding vertices; and classifying the edges into two types, a first type of edges connecting two vertices that are to be patterned separately with the first and second lithography techniques, a second type of edges connecting two vertices that are to be patterned in a same process using the first lithography technique or to be patterned separately with the first and second lithography techniques. The method further includes decomposing the vertices into a first subset and a second subset, wherein the IC patterns corresponding to the first subset are to be patterned on a wafer to form a first etch mask using the first lithography technique, and the IC patterns corresponding to the second subset are to be patterned on the wafer to form a second etch mask using the second lithography technique, wherein the first and second etch masks collectively transfer the IC patterns onto the wafer.

In an embodiment, after the step of classifying, the method further includes checking if there is a loop formed by odd number of vertices connected by edges of the first type. In another embodiment, after the step of classifying, the method further includes assigning colors X and Y to all vertices that are connected by edges of the first type, wherein two vertices connected by a common edge of the first type are assigned with different colors.

In an embodiment, after the step of assigning colors X and Y, the method further includes initially assigning color A to all pairs of vertices that are assigned with the same color X or same color Y and are connected directly by an edge of the second type; and placing vertices with color A into the first subset. In a further embodiment, after the step of initially assigning color A, the method further includes assigning color B to all vertices that are not colored with colors A or B and are connected to vertices with color A directly by an edge of the first type. After the step of assigning color B, the method further includes subsequently assigning color A to all vertices that are not colored with colors A or B and are connected to vertices with color B directly by an edge of the first or second type. The method further includes repeating the steps of assigning color B and subsequently assigning color A to rest of the vertices in the graph; placing vertices with color A into the first subset; and placing vertices with color B into the second subset.

In yet another exemplary aspect, the present disclosure is directed to a method of fabricating an integrated circuit (IC) with a first lithography technique having a first resolution and a second lithography technique having a second resolution larger than the first resolution. The method includes providing a layout of the IC, the layout having a set of IC patterns; and deriving a graph from the layout, the graph having vertices and edges that connect some of the vertices, the vertices representing the IC patterns, the edges representing spacing between the IC patterns that are smaller than the second resolution. The method further includes classifying the edges into at least two types, a first type representing spacing that is smaller than the first resolution, a second type representing spacing that is equal to or greater than the first resolution but smaller than the second resolution. The method further includes decomposing the vertices into a first subset and a second subset, wherein the IC patterns corresponding to the first subset are to be patterned on a wafer using the first lithography technique, and the IC patterns corresponding to the second subset are to be patterned on the wafer using the second lithography technique, wherein at least one of deriving, classifying, and decomposing is performed by a computerized IC tool.

In an embodiment, after the step of classifying, the method further includes assigning colors X and Y to all vertices that are connected by edges of the first type, wherein two vertices connected by a common edge of the first type are assigned with different colors. In a further embodiment, after the step of assigning colors X and Y, the method includes assigning color A to all pairs of vertices that are assigned with the same color X or same color Y and are connected directly by an edge of the second type; and progressively coloring rest of vertices with colors A and B by performing: assigning different colors to two vertices directly connected by an edge of the first type; assigning color A to a vertex that is directly connected to a vertex with color B by an edge of the second type; and assigning either color A or color B to a vertex that is directly connected to a vertex with color A by an edge of the second type. The method further includes placing vertices with color A into the first subset and vertices with color B into the second subset.

In one exemplary aspect, the present disclosure is directed to a method of fabricating an integrated circuit (IC) with a first lithography technique having a first resolution and a second lithography technique having a second resolution larger than the first resolution. The method includes providing a layout of the IC, the layout having a set of IC patterns; and deriving a graph from the layout, the graph having vertices and edges that connect some of the vertices, the vertices representing the IC patterns, the edges representing spacing between the IC patterns that are smaller than the second resolution. The method further includes classifying the edges into two types, a first type representing spacing that is smaller than the first resolution, a second type representing spacing that is equal to or greater than the first resolution but smaller than the second resolution; and using a computerized IC tool, decomposing the vertices into a first subset and a second subset. The decomposing includes locating a pair of vertices connected by an edge of the second type; on condition that there is a path between the pair of vertices through only edges of the first type and the number of edges of the first type on the path is even, assigning color A to the pair of vertices; and progressively coloring rest of vertices with colors A and B by: assigning different colors to two vertices directly connected by an edge of the first type, assigning color A to a vertex that is directly connected to a vertex with color B by an edge of the second type, and assigning either color A or color B to a vertex that is directly connected to a vertex with color A by an edge of the second type. The method further includes placing vertices with color A into the first subset and vertices with color B into the second subset.

In an embodiment, after the step of classifying, the method further includes checking if there is a loop formed by odd number of vertices connected by edges of the first type; and on condition that there is such a loop, modifying the layout to break the loop. In another embodiment, after the progressively coloring rest of vertices with colors A and B, the method further includes checking if there is a pair of vertices that are colored with color B and are connected by an edge of the second type; and on condition that such pair exists, modifying the layout.

In another exemplary aspect, the present disclosure is directed to a method of fabricating an integrated circuit (IC) with a first lithography technique having a first resolution and a second lithography technique having a second resolution larger than the first resolution. The method includes providing a layout of the IC, the layout having a set of IC patterns; and deriving a graph from the layout, the graph having vertices and edges that connect some of the vertices, the vertices representing the IC patterns, the edges representing spacing between the IC patterns that are smaller than the second resolution. The method further includes classifying the edges into two types, a first type representing spacing that is smaller than the first resolution, a second type representing spacing that is equal to or greater than the first resolution but smaller than the second resolution; and using a computerized IC tool, decomposing the vertices into a first subset and a second subset. The decomposing includes assigning colors X and Y to all vertices that are connected by edges of the first type, wherein two vertices connected by a common edge of the first type are assigned with different colors; assigning color A to all pairs of vertices that are assigned with the same color X or same color Y and are connected directly by an edge of the second type; and progressively coloring rest of vertices with colors A and B by: assigning different colors to two vertices directly connected by an edge of the first type, assigning color A to a vertex that is directly connected to a vertex with color B by an edge of the second type, and assigning either color A or color B to a vertex that is directly connected to a vertex with color A by an edge of the second type. The method further includes placing vertices with color A into the first subset and vertices with color B into the second subset.

In an embodiment, after the step of classifying, the method further includes checking if there is a loop formed by odd number of vertices connected by edges of the first type; and on condition that there is such a loop, modifying the layout to break the loop.

In another embodiment, after the assigning colors X and Y, the method further includes identifying a network of vertices that are connected to each other through edges of the first type; and on condition that a first pair of vertices in the network are assigned with the same color X and are connected directly by an edge of the second type and a second pair of vertices in the network are assigned with the same color Y and are connected directly by another edge of the second type, modifying the layout to split the network.

In yet another embodiment, after the progressively coloring the rest of vertices with colors A and B, the method further includes on condition that there is a pair of vertices that are colored with color B and are connected by an edge of the second type, modifying the layout so as to remove the edge of the second type between the pair.

In yet another exemplary aspect, the present disclosure is directed to a method of fabricating an integrated circuit (IC) with a first lithography technique and a second lithography technique different from the first lithography technique. The method includes providing a layout of the IC, the layout having a set of IC patterns; and deriving a graph from the layout, the graph having vertices and edges that connect some of the vertices, the vertices representing the IC patterns, the edges being classified into at least two types, a first type of edges connecting two vertices that are to be patterned separately with the first and second lithography techniques, a second type of edges connecting two vertices that are to be patterned in a same process using the first lithography technique or to be patterned separately with the first and second lithography techniques. The method further includes, on condition that there is a loop formed by odd number of vertices connected by edges of the first type, modifying the layout to break the loop. The method further includes decomposing, using a computerized IC tool, the vertices into a first subset and a second subset, wherein the IC patterns corresponding to the first subset are to be patterned on a wafer using the first lithography technique, and the IC patterns corresponding to the second subset are to be patterned on the wafer using the second lithography technique. The decomposing includes assigning colors X and Y to all vertices that are connected by edges of the first type, wherein two vertices connected by a common edge of the first type are assigned with different colors; assigning color A to all pairs of vertices that are assigned with the same color X or same color Y and are connected directly by an edge of the second type; assigning color B to all vertices that are not colored with colors A or B and are connected to vertices with color A directly by an edge of the first type; and placing vertices with color A into the first subset and vertices with color B into the second subset.

In an embodiment, the method further includes after the step of assigning color B, subsequently assigning color A to all vertices that are not colored with colors A or B and are connected to vertices with color B directly by an edge of the first or second type; and repeating the steps of assigning color B and subsequently assigning color A to rest of the vertices in the graph. In a further embodiment, after the assigning colors X and Y, the method further includes identifying a network of vertices that are connected to each other through edges of the first type; and on condition that a first pair of vertices in the network are assigned with the same color X and are connected directly by an edge of the second type and a second pair of vertices in the network are assigned with the same color Y and are connected directly by another edge of the second type, modifying the layout to split the network.

The foregoing outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A method of fabricating an integrated circuit (IC) with a first lithography technique and a second lithography technique different from the first lithography technique, comprising the steps of:
   providing a layout of the IC, the layout having a set of IC patterns;
   deriving a graph from the layout, the graph having vertices and edges that connect some of the vertices, the vertices representing the IC patterns, the edges being classified into at least two types, a first type of edges connecting two vertices that are to be patterned separately with the first and second lithography techniques, a second type of edges connecting two vertices that are to be patterned in a same process using the first lithography technique or to be patterned separately with the first and second lithography techniques; and
   decomposing, using a computerized IC tool, the vertices into a first subset and a second subset, wherein the IC patterns corresponding to the first subset are to be patterned on a wafer using the first lithography technique, and the IC patterns corresponding to the second subset are to be patterned on the wafer using the second lithography technique.

2. The method of claim 1, after the step of deriving, further comprising the steps of:
  checking if there is a loop formed by odd number of vertices connected by edges of the first type; and
  on condition that there is such a loop, modifying the layout to break the loop.

3. The method of claim 1, after the step of deriving, further comprising the step of:
  assigning colors X and Y to all vertices that are connected by edges of the first type, wherein two vertices connected by a common edge of the first type are assigned with different colors.

4. The method of claim 3, after the step of assigning colors X and Y, further comprising the steps of:
  identifying a network of vertices that are connected to each other through edges of the first type;
  checking if there are two pairs of vertices in the network such that a first pair are assigned with the same color X and are connected directly by an edge of the second type and a second pair are assigned with the same color Y and are connected directly by another edge of the second type; and
  on condition that there are such two pairs, modifying the layout to prevent such two pairs.

5. The method of claim 3, after the step of assigning colors X and Y, further comprising the steps of:
  assigning initially color A to all pairs of vertices that are assigned with the same color X or same color Y and are connected directly by an edge of the second type; and
  placing vertices with color A into the first subset.

6. The method of claim 5, after the step of assigning initially color A, further comprising the steps of:
  assigning color B to all vertices that are not colored with colors A or B and are connected to vertices with color A directly by an edge of the first type;
  after the step of assigning color B, assigning subsequently color A to all vertices that are not colored with colors A or B and are connected to vertices with color B directly by an edge of the first or second type;
  repeating the steps of assigning color B and assigning subsequently color A to rest of the vertices in the graph; and
  placing vertices with color A into the first subset and vertices with color B into the second subset.

7. The method of claim 6, after the step of repeating, further comprising the steps of:
  checking if there is a pair of vertices that are colored with color B and are connected by an edge of the second type; and
  on condition that such pair exists, modifying the layout.

8. The method of claim 6, after the step of repeating, further comprising the step of:
  on condition that there are vertices that are not colored with either color A or color B, assigning color A or color B to the vertices to balance mask loading between the first and second subsets.

9. The method of claim 6, after the step of repeating, further comprising the steps of:
  fabricating a first photomask with the IC patterns corresponding to the first subset of vertices; and
  fabricating a second photomask with the IC patterns corresponding to the second subset of vertices.

10. The method of claim 6, further comprising the steps of:
  performing a first lithography process to a wafer using the first lithography technique to produce a first subset of etch mask patterns corresponding to the first subset of vertices;
  performing a second lithography process to the wafer using the second lithography technique to produce a second subset of etch mask patterns corresponding to the second subset of vertices; and
  etching the wafer using both the first and the second subsets of etch mask patterns.

11. The method of claim 1, after the step of deriving, further comprising the steps of:
  locating a pair of vertices connected by an edge of the second type;
  checking if there is a path between the pair of vertices through only edges of the first type;
  on condition that such a path exists and the number of edges of the first type on the path is even, assigning initially color A to the pair of vertices; and
  placing vertices with color A into the first subset.

12. The method of claim 11, after the step of assigning initially color A, further comprising the steps of:
  assigning color B to all vertices that are not colored with colors A or B and are connected to vertices with color A directly by an edge of the first type;
  after the step of assigning color B, assigning subsequently color A to all vertices that are not colored with colors A or B and are connected to vertices with color B directly by an edge of the first or second type;
  repeating the steps of assigning color B and assigning subsequently color A to rest of the vertices in the graph; and
  placing vertices with color A into the first subset and vertices with color B into the second subset.

13. A method of fabricating an integrated circuit (IC) with a first lithography technique and a second lithography technique having a lower resolution than the first lithography technique, comprising the steps of:
  providing a layout of the IC, the layout having a set of IC patterns;
  deriving a graph from the layout by representing the IC patterns with vertices and representing spacing between IC patterns with edges connecting the corresponding vertices;
  classifying the edges into two types, a first type of edges connecting two vertices that are to be patterned separately with the first and second lithography techniques, a second type of edges connecting two vertices that are to be patterned in a same process using the first lithography technique or to be patterned separately with the first and second lithography techniques; and
  decomposing the vertices into a first subset and a second subset, wherein the IC patterns corresponding to the first subset are to be patterned on a wafer to form a first etch mask using the first lithography technique, and the IC patterns corresponding to the second subset are to be patterned on the wafer to form a second etch mask using the second lithography technique, wherein the first and second etch masks collectively transfer the IC patterns onto the wafer.

14. The method of claim 13, after the step of classifying, further comprising the step of:
  checking if there is a loop formed by odd number of vertices connected by edges of the first type.

15. The method of claim 13, after the step of classifying, further comprising the step of:

assigning colors X and Y to all vertices that are connected by edges of the first type, wherein two vertices connected by a common edge of the first type are assigned with different colors.

16. The method of claim 13, after the step of assigning colors X and Y, further comprising the steps of:
    initially assigning color A to all pairs of vertices that are assigned with the same color X or same color Y and are connected directly by an edge of the second type; and
    placing vertices with color A into the first subset.

17. The method of claim 16, after the step of initially assigning color A, further comprising the steps of:
    assigning color B to all vertices that are not colored with colors A or B and are connected to vertices with color A directly by an edge of the first type;
    after the step of assigning color B, subsequently assigning color A to all vertices that are not colored with colors A or B and are connected to vertices with color B directly by an edge of the first or second type;
    repeating the steps of assigning color B and subsequently assigning color A to rest of the vertices in the graph;
    placing vertices with color A into the first subset; and
    placing vertices with color B into the second subset.

18. A method of fabricating an integrated circuit (IC) with a first lithography technique having a first resolution and a second lithography technique having a second resolution larger than the first resolution, comprising the steps of:
    providing a layout of the IC, the layout having a set of IC patterns;
    deriving a graph from the layout, the graph having vertices and edges that connect some of the vertices, the vertices representing the IC patterns, the edges representing spacing between the IC patterns that are smaller than the second resolution;
    classifying the edges into at least two types, a first type representing spacing that is smaller than the first resolution, a second type representing spacing that is equal to or greater than the first resolution but smaller than the second resolution; and
    decomposing the vertices into a first subset and a second subset, wherein the IC patterns corresponding to the first subset are to be patterned on a wafer using the first lithography technique, and the IC patterns corresponding to the second subset are to be patterned on the wafer using the second lithography technique, wherein at least one of deriving, classifying, and decomposing is performed by a computerized IC tool.

19. The method of claim 18, after the step of classifying, further comprising the step of:
    assigning colors X and Y to all vertices that are connected by edges of the first type, wherein two vertices connected by a common edge of the first type are assigned with different colors.

20. The method of claim 19, after the step of assigning colors X and Y, further comprising the steps of:
    assigning color A to all pairs of vertices that are assigned with the same color X or same color Y and are connected directly by an edge of the second type;
    progressively coloring rest of vertices with colors A and B by performing:
        assigning different colors to two vertices directly connected by an edge of the first type;
        assigning color A to a vertex that is directly connected to a vertex with color B by an edge of the second type; and
        assigning either color A or color B to a vertex that is directly connected to a vertex with color A by an edge of the second type; and
    placing vertices with color A into the first subset and vertices with color B into the second subset.

* * * * *